(12) United States Patent
Nguyen et al.

(10) Patent No.: US 8,031,979 B2
(45) Date of Patent: Oct. 4, 2011

(54) METHOD AND DEVICE FOR VERIFYING MULTIMEDIA ENTITIES AND IN PARTICULAR FOR VERIFYING DIGITAL IMAGES

(75) Inventors: Eric Nguyen, Rennes (FR); Hervé Le Floch, Rennes (FR); Stéphane Baron, Le Rheu (FR)

(73) Assignee: Canon Research Centre France, Cesson-Sevigne (FR)

( * ) Notice: Subject to any disclaimer, the term of this patent is extended or adjusted under 35 U.S.C. 154(b) by 1891 days.

(21) Appl. No.: 10/948,178

(22) Filed: Sep. 24, 2004

(65) Prior Publication Data

US 2005/0105798 A1 May 19, 2005

(30) Foreign Application Priority Data

Sep. 25, 2003 (FR) .................................. 03 11269
Sep. 23, 2004 (FR) .................................. 04 10087
Sep. 23, 2004 (FR) .................................. 04 10088

(51) Int. Cl.
*G06K 9/54* (2006.01)

(52) U.S. Cl. ...................................................... 382/305

(58) Field of Classification Search .................. 382/305, 382/181–231, 306

See application file for complete search history.

(56) References Cited

U.S. PATENT DOCUMENTS

| | | | |
|---|---|---|---|
| 5,644,765 A * | 7/1997 | Shimura et al. ............ 707/104.1 |
| 5,848,155 A * | 12/1998 | Cox .............................. 382/191 |
| 5,862,260 A | 1/1999 | Rhoads ....................... 382/232 |
| 6,026,411 A | 2/2000 | Delp ............................ 707/104 |
| 6,078,914 A * | 6/2000 | Redfern ......................... 707/3 |
| 6,263,121 B1 * | 7/2001 | Melen et al. ................. 382/305 |
| 6,327,574 B1 * | 12/2001 | Kramer et al. ................ 705/14 |
| 6,430,301 B1 | 8/2002 | Petrovic ...................... 382/100 |
| 6,442,538 B1 * | 8/2002 | Nojima .............................. 1/1 |
| 6,574,350 B1 | 6/2003 | Rhoads et al. .............. 382/100 |
| 6,792,128 B1 | 9/2004 | Nguyen ....................... 382/100 |
| 7,236,652 B2 * | 6/2007 | Kasutani ..................... 382/305 |
| 2002/0159640 A1 * | 10/2002 | Vaithilingam et al. ...... 382/218 |
| 2002/0161747 A1 * | 10/2002 | Li et al. .......................... 707/3 |
| 2002/0188841 A1 | 12/2002 | Jones et al. ................. 713/153 |
| 2003/0053657 A1 | 3/2003 | Le Floch ..................... 382/100 |
| 2003/0105739 A1 | 6/2003 | Essafi et al. ................... 707/1 |
| 2003/0133153 A1 | 7/2003 | Shinoda .................... 258/1.15 |
| 2003/0231806 A1 | 12/2003 | Troyanker .................. 382/305 |
| 2004/0202386 A1 * | 10/2004 | Quine ......................... 382/305 |

FOREIGN PATENT DOCUMENTS

| | | |
|---|---|---|
| EP | 0 884 669 A2 | 12/1998 |
| EP | 1 467 292 A1 | 10/2004 |
| FR | 2 831 006 | 4/2003 |

OTHER PUBLICATIONS

M.A. Fishier and R.C. Bolles, "Random Sample Consensus: A Paradigm for Model Fitting With Applications to Image Analysis and Automated Cartography", ACM, vol. 24, No. 6, pp. 381-395, 1981.
Cordelia Schmid, et al., "Local Grayvalue Invariants for Image Retrieval," IEEE Transactions on Pattern Analysis and Machine Intelligence, vol. 19, No. 5, May 1997, pp. 530-535.

(Continued)

*Primary Examiner* — Phuoc Tran
*Assistant Examiner* — Alex Liew
(74) *Attorney, Agent, or Firm* — Fitzpatrick, Cella, Harper & Scinto

(57) ABSTRACT

The method of verifying multimedia entities according to the invention to determine whether a first multimedia entity matches a second multimedia entity, is characterized in that it comprises a step of selecting from a plurality of second multimedia entities, by a content-based search, a set of second multimedia entities close to the first multimedia entity, and a step of deciding as to at least one match between the first multimedia entity and at least one second multimedia entity of the set of second multimedia entities, based on a comparison between the first multimedia entity and the second multimedia entities of the set.

36 Claims, 21 Drawing Sheets

OTHER PUBLICATIONS

P. Gros, et al., "Using Color for Image Matching and Indexing, Rapport de recherche de l'INRIA-Rhône-Alpes", Sep. 1997, p. 1-41.

Gaetan Le Guelvouit, et al, "Perceptual Watermarking on Non I.I.D. Signals Based on Wide Spread Spectrum Using Side Information", European Signal Proc. Conference, Sep. 2002.

P.H.S. Torr, et al., "MLESAC: A New Robust Estimator With Application to Estimating Image Geometry", Microsoft Research Ltd., Robotics Research Group, Department of Engineering Science, pp. 138-156, Apr. 2000.

* cited by examiner

| | | |
|---|---|---|
| $T_0$ | Identity | $T'_2 o T'_2$ |
| $T_1$ | Rotation 90° | $T'_1$ |
| $T_2$ | Reflection with vertical axis | $T'_2$ |
| $T_3$ | Rotation 180° | $T'_1 o T'_1$ |
| $T_4$ | Rotation 270° | $T'_1 o T'_1 o T'_2$ |
| $T_5$ | Reflection with horizontal axis | $T'_2 o T'_1 o T'_2$ |
| $T_6$ | Reflection with vertical axis +Rotation 90° | $T'_2 o T'_1$ |
| $T_7$ | Transposition | $T'_1 o T'_2$ |

Figure 20

METHOD AND DEVICE FOR VERIFYING MULTIMEDIA ENTITIES AND IN PARTICULAR FOR VERIFYING DIGITAL IMAGES

The present invention concerns a method and device for verifying multimedia entities. More particularly, the present invention concerns a method and device for verifying multimedia entitles adapted for the verification of digital images.

The invention finds application in the field of the search for and matching of multimedia entities according to their content.

The Internet network represents an immense stock of information of all kinds. Images form an increasingly large part thereof, and it is becoming very difficult to control the use which is made of an image published on a web site.

Devices for verifying images have appeared in order to attempt to control the use of certain images on the Internet network.

The function of a device for verifying images on the Internet network is to determine whether images, recorded beforehand with a recording operator or with the operator managing the image verifying device in order to protect them, are published on one or more Web sites. Thus, a particular application of such a device is the search on the Internet network for images of which the use is illegal.

The images recorded beforehand are those whose use it is desired to check by those possessing the rights. Those possessing the rights are, for example, photograph distribution agencies, photographers or image creators.

According to the aforementioned particular application, images are retrieved from given Web sites, these images being termed published images in what follows, and each published image is compared to the images recorded beforehand, referred to as proprietary images in what follows, by means of a verifying device.

The performance of an image verifying device is measured in terms of a compromise between the rate of false alarms, the non-detection rate and the processing time.

It will be noted that the rate of false alarms is equal to the percentage of the published images which are detected as matching an image recorded beforehand whereas they are not the same image.

As regards the non-detection rate, this corresponds to the percentage of the published images that are not detected by the image verifying device whereas these published images are the same as images recorded beforehand.

Finally, the processing time corresponds to the time necessary to process the images to be verified (images coming for example from the Web).

The rate of false alarms and the rate of non-detection are functions of each other, one increasing as the other decreases. From the point of view of the user, it is important to be able to set the false alarm rate to a low value in order for the alarms given by the image verifying device and received by the users to be practically all valid.

Moreover, the image verifying device must be able to recognize an image even if it has undergone a modification, but it must however avoid deciding that it is the same image if this is not the case. The modifications may for example consist in reframing, changes in size, changes in brightness or contrast, color changes. etc. Furthermore, these modifications may be followed by lossy compression. Thus, all these modifications may have a non-negligible impact on the visual appearance of the image used, which does not facilitate the decision taking by the image verifying device.

Moreover, image verifying devices need to be optimized in terms of their complexity, due to constraints on processing time and the hardware resources available.

Thus, the image verifying device must be capable of continuously processing large volumes of images to be verified within a period acceptable to the user, which imposes an upper limit in terms of processing time, and at minimum cost.

The known image verifying devices generally use a single comparison technique, which is a technique based on watermarking, or a technique based on a characterization of the image, or a technique for comparing the description of the image published on a Web site with the descriptions of the protected images. According to the result of that comparison, it is then decided whether or not the published image matches a particular protected image.

More particularly, a form of image verification in which solely a technique of invisible watermarking of images is used cannot give a guaranteed non-detection rate, since the robustness of watermarking techniques is limited in relation to the modifications which the published image may have undergone. Thus, the watermark inserted in the image may be erased by certain manipulations, even if unintentional. Consequently, the detection rate may become equal to zero for certain image manipulations.

Moreover, the number of items of information which it is possible to insert in images is inherently limited by the visibility constraint of the watermark, and this number decreases with the desired level of robustness. In the current state of the art, for a level of robustness that is compatible with the expectations of users of an image verifying device, the number of these items of information able to be inserted is insufficient for the encoding of a unique identifier per image.

Thus, the image verifying device described in document U.S. Pat. No. 5,862,260 only, for example, enables a simple identification of the owner of the image and not of that of the image itself, given the fact that the number of possible images is considerably greater than the number of owners.

An image verifying device using an image characterization technique, like the one described in document U.S. Pat. No. 6,026,411, relies on supplementary information of the recorded images. Such a device can in principle give a guaranteed non-detection rate that is arbitrarily low by sending back to the user the set of the images most similar to the image to be verified. A drawback of such a device, given the dependency between the respective levels of the non-detection and false alarm rates, is that it leads to a false alarm rate incompatible with the expectation of the users of an image verifying device.

Furthermore, a device for verifying images using a technique of comparing the description of the image published on a Web site with the descriptions of the protected images, such as that described in the document FR 2 831 006, relies on information representing the visual content of the images. Thus the recorded images are described using digital descriptors calculated from the visual content of the images. These descriptors are then compared with those of the images that are published and that are thus used. According to the result of that comparison, it is then decided whether there is a match or non-match between two compared images.

A drawback of such a device, in addition to the level of robustness that is variable according to the description techniques used, lies in the fact that the decision cannot be made with certainty. This is because it is still possible for images to be different whose content is identical in terms of the image descriptors.

Consequently, in addition to the problems of robustness, the prior art image verifying devices described above are ill-adapted to guarantee the user a specific level of performance.

To increase the performance level, one solution would be to use additional, more complex, verifying techniques, using in particular information on the recorded images. A step of geometric readjustment of the image to verify would in particular make it possible to increase the performance (in particular the false alarm rate) of image verifying devices using watermarking or image characterization. However, such techniques are inherently very costly in processing time. Moreover, they must be applied to all the images of the base of recorded images for every image to verify. The application of these additional complex verifying techniques thus poses a technical problem to the person skilled in the art given the volume of information to be processed and the constraint on processing time.

Given the above, it would be useful to be able to verify multimedia entities while guaranteeing a good level of performance under the constraint of a limited processing time.

According to a first aspect, the invention relates to a method of verifying multimedia entities according to the invention to determine whether a first multimedia entity matches a second multimedia entity, characterized in that it comprises the steps of:

selecting, by a content-based search, from a plurality of second multimedia entities, a set of second multimedia entities close to the first multimedia entity, and deciding as to at least one match between the first multimedia entity and at least one second multimedia entity of the set of second multimedia entities, based on a comparison between the first multimedia entity and the second multimedia entities of the set.

The principle of the method of verifying multimedia entities according to the invention relies on a division into two steps, namely, a selecting step and a deciding step. This division into two steps, associated with the use of techniques adapted to each of the steps, permits the use of complex techniques for decision ensuring a sufficiently low rate of false alarms with control over the detection time and the non-detection rate.

The content-based search of the selecting step has the advantage of using characteristics of the multimedia entities that are inherent, which a possible pirate is little inclined to modify or erase.

At the deciding step, taking into account the fact that the number of second multimedia entities selected is few, and preferably fixed, it is possible to employ techniques whose complexity prevents their use in the selecting step, in order to not to drastically increase the detection time.

Due to this division into a selecting step and a deciding step, it is possible to extract a part of the processing operations of which the execution time is directly dependent on the number of second multimedia entities.

In the selecting step, the selected set of second multimedia entities comprises the K second multimedia entities that are the closest to the first multimedia entity, K having a predetermined constant value.

The value of K is involved in the calculation of the non-detection level and may be determined theoretically or empirically according to the techniques utilized.

In a verification method according to the prior art, i.e., without division into two steps, the following equality (1) is obtained:

$$T = f1(Nr) \qquad (1),$$

with the detection time T which is an increasing function $f1(\ )$ of the number Nr of the second multimedia entities.

After the division into two steps, of selection and of decision, according to the present invention, the equality (2) is obtained:

$$T = Ts + Td, \text{ with } Ts = f2(Nr) \text{ and } Td = f3(K) = \text{constant} \qquad (2),$$

with the selection time Ts which is an increasing function $f2(\ )$ of the number Nr of the second multimedia entities, and the decision time Td which is a constant in that K has a constant value.

This leads to equality (3):

$$T = f2(Nr) + \text{constant} \qquad (3).$$

Due to the constant value of the decision time, Td=constant, it is possible to use more complex and sophisticated techniques for comparison in the deciding step.

According to other features, the method according to the invention comprises the sub-steps of:

calculating one or more first descriptors for the first multimedia entity, and obtaining at least one second descriptor for each second multimedia entity;

and the content-bases search uses the first and second descriptors describing the first and second multimedia entities for selecting the set of second multimedia entities.

For example, the descriptors comprise at least one descriptor of global type and/or at least one descriptor of local type.

According to the level of precision desired in the selecting step, a number of options as to the choice of descriptors are possible.

If it is desired to favor a high processing speed, then fast descriptors are the best adapted. If, on the other hand, robustness to multiple geometric transformations is preferential (in particular robustness to any reframing of the digital images), local descriptors will be more adapted. The case giving the best performance from the point of view of the non-detection rate is the placing in parallel of a number of types of descriptors.

According to still another feature, the deciding step comprises sub-steps of readjusting the first multimedia entity relative to a second multimedia entity in course of processing the set of second multimedia entities, measuring a level of match, after readjusting, between the first multimedia entity and the second multimedia entity in course of processing the set of second multimedia entities, and comparing the level of match and a first predetermined threshold in order to decide on the match between the first multimedia entity and the second multimedia entity in course of processing the set of second multimedia entities.

The readjusting sub-step may comprise a change of scale of the first multimedia entity and/or reframing of the first multimedia entity and/or use of units of interest in the multimedia entities.

The above feature is desirable in particular when the first multimedia entity, for example retrieved from the Internet network, is a modified version of a second selected multimedia entity. In the case of a digital image, such a modification comprises for example a modification of the colors and/or of the geometric modifications (reframing, changes of scale, etc.).

According one embodiment, the deciding step comprises sub-steps of:

extracting a first watermarking message inserted into the first multimedia entity, calculating a binary distance between the first watermarking message and a second watermarking message of a second multimedia entity in course of processing the set of second multimedia entities, and comparing the binary distance and a second predetermined threshold in order to decide on the match between the first multimedia entity and the second multimedia entity in course of processing the set of second multimedia entities.

According to one feature, the extraction of the first watermarking message inserted into said first multimedia entity is performed on the basis of at least one extraction parameter associated with the second watermarking message of the second multimedia entity.

The extraction of a message on the basis of extraction parameters makes it possible to retrieve the watermarked message with a so-called non-blind technique, such a technique being particularly advantageous in terms of performance.

According to a particular feature, the extraction parameter is associated with at least one insertion parameter used for the insertion of said second watermarking message in the second multimedia entity.

This is because the extraction parameters for a message in a watermarked image are associated with insertion parameters which were necessary for the insertion of the message in the image.

In one embodiment, the deciding step may also comprise a sub-step of readjusting the first multimedia entity relative to the second multimedia entity in course of processing the set of second multimedia entities, the readjusting sub-step being performed before the extracting sub-step in order to enable extraction of the first watermarking message from the readjusted first multimedia entity.

The method according to the invention, due to the division into two steps of selecting and deciding, permits complex algorithm use for watermark detection or geometric readjustment.

According to one embodiment, at the comparing step, an alarm is given when the probability of error is less than a predetermined alarm threshold. The level of the alarm threshold determines the probability of false alarm. Certain second multimedia entities selected at the deciding step and having an error probability greater than the alarm threshold may give rise to a simple warning.

The method according to the invention has a particular application in the verification of digital images. In this application, digital images may be represented, at the operator managing the image verifying device, and according to the processing performed, by metadata and/or a low resolution summary and/or a set of points of interest and/or dimensions of the images and/or a visual descriptor of the image.

Concerning the verification of digital images, one embodiment of the method according to the invention comprises the use of global descriptors in the selecting step and the use of a watermark in the deciding step. A global descriptor usable in this embodiment is for example the global descriptor described in the document FR 0304595.

Still in the field of digital images, another embodiment of the method according to the invention comprises the use of local descriptors in the selecting step and the use of a geometric readjustment in the deciding step.

For further information concerning local descriptors and the techniques associated with their use, reference may be made in particular to the following:

the article entitled "Local grayvalue invariants for image retrieval" by C. Schmid and R. Mohr, IEEE Transactions on Pattern Analysis and Machine Intelligence, Vol. 19, N°5, pages 530 to 534, 1997;

the article entitled "Utilisation de la couleur pour l'appariement et l'indexation d'images" (which title may be translated by "Use of color for matching and indexing images") by P. Gros et al., Rapport de Recherche INRIA, N°3269, September 1997;

the article entitled "MLESAC: A new robust estimator with application to estimating image geometry" by P. Torr and A. Zisserman, CVIU, Vol. 78, pages 138 to 156, 2000.

According to one feature, prior to the selecting step, a step of obtaining the first multimedia entity is performed.

This is because it is necessary beforehand to obtain the multimedia entity which must be verified using the method in accordance with the invention.

According to one embodiment, the deciding step is followed by a step of producing a report on the match or non-match between the first multimedia entity and said at least one second multimedia entity.

At the end of the verification of the match between a first multimedia entity and a second multimedia entity, a similarity report can be issued.

According to one feature, the first multimedia entity is a request multimedia entity and the set of second multimedia entities is the set of reference multimedia entities.

According to one embodiment, the request multimedia entity is obtained from a network.

This is because the first multimedia entity may be present on a communication network, for example the Internet.

According to one feature, the obtainment of the first multimedia entity comprises a step of identifying the address on the network of the request multimedia entity and/or the address referencing the request multimedia entity.

The obtainment of the address of an image makes it possible to know the source of the image and to retrieve it if necessary.

According to one feature, the report comprises metadata and/or the low resolution summary and/or the set of points of interest and/or the dimensions of said multimedia entities.

According to a particular embodiment, the report comprises the address of the request multimedia entity and/or the address referencing the request multimedia entity.

Thus, the owner of a reference image may find and verify the similarity of his image with a request image.

The address referencing the request multimedia entity makes it possible to know the context of use of that request multimedia entity.

According to a particular embodiment, the method further comprises a step of recording the first multimedia entity in a set of first multimedia entities.

According to a first embodiment, the set of first multimedia entities is a set of reference multimedia entities and the set of second multimedia entities is a set of request multimedia entities.

According to a second embodiment, the set of first multimedia entities is a set of request multimedia entities and the set of second multimedia entities is a set of reference multimedia entities.

According to one feature, the set of request multimedia entities comprises a predetermined number of request multimedia entities.

According to another feature, the set of request multimedia entities comprises request multimedia entities obtained after a given date.

According to one feature, in case of match between the reference multimedia entity and the request multimedia entity, the report comprises the address on a network of the request multimedia.

According to one feature, the deciding step comprises substeps of obtaining a first criterion (C1) of match reliability, comparing the first reliability criterion (C1) obtained with a predetermined threshold, according to the result of the comparison, deciding as to a first match between the first multimedia entity and the second multimedia entity, in case of positive first match decision, the method comprises the following steps:

extracting a first item of information from the first multimedia entity, comparing between the extracted item of information and a second item of information of the second multimedia entity, obtaining a second criterion (C2) of match reliability, according to the result of the comparison of items of information, deciding as to a match between the first and second items of information, deciding as to a second match between the first multimedia entity and the second multimedia entity depending, on the one hand, on the decision of the first match between the first and second multimedia entity and, on the other hand, on the decision as to a match between the first and second items of information, and determining a measurement of the reliability of the decision as to the second match depending on at least one of the first and second match reliability criteria.

According to a second aspect, the present invention relates to a method of verifying at least one match between a first multimedia entity and a second multimedia entity. The method comprises the following steps:

obtaining a first criterion (C1) of match reliability, comparing the first reliability criterion (C1) obtained with a predetermined threshold, according to the result of the comparison, deciding as to a first match between the first multimedia entity and the second multimedia entity, in case of positive first match decision, the method comprises the following steps:

extracting a first item of information from the first multimedia entity, comparing between the extracted item of information and a second item of information of the second multimedia entity, obtaining a second criterion (C2) of match reliability, according to the result of the comparison of items of information, deciding as to a match between the first and second items of information, and deciding as to a second match between the first multimedia entity and the second multimedia entity depending, on the one hand, on the decision of the first match between the first and second multimedia entity and, on the other hand, on the decision as to a match between the first and second items of information and, determining a measurement of the reliability of the decision as to the second match depending on at least one of the first and second match reliability criteria.

The principle of the method of verifying multimedia entities according to a second aspect of the invention relies on a division into two match decisions, i.e. a first step of deciding as to a first match and a second step of deciding as to a second match. This division into two steps, associated with the use of different verifying techniques at each of the steps, ensures a sufficiently low level of false alarms, and thus a very satisfactory level of effectiveness.

The decision as to a second match is taken on the one hand depending on the decision as to a first match and, on the other hand depending on the decision as to a match between a first item of information contained in the first multimedia entity and a second item of information of the second multimedia entity.

A first criterion C1 of match reliability makes it possible to evaluate the reliability of the decision as to first match, and a second criterion C2 of match reliability is, for example, a false alarm probability which is involved at the time of comparison between the first item of information contained in the first multimedia entity and the second item of information of the second multimedia entity.

At the issue of the match decision steps, a measurement of the reliability of the decision as to the second match is determined. This measurement depends, on the one hand, on the results of the decision as to the first match and the decision as to a match between the first and second items of information, and on the other hand, on the first and/or second criterion.

Thus, the invention makes it possible to generate decisions and a reliability measurement of those decisions.

According to one feature, the first item of information extracted from the first multimedia entity is a watermarking message.

According to this feature, the match arising from the positive decision of first match is based on the watermarking detection.

According to a particular feature, the extraction of the watermarking message is performed on the basis of at least one extraction parameter associated with a second watermarking message of the second multimedia entity.

The extraction of a message on the basis of extraction parameters makes it possible to retrieve the watermarked message with a so-called non-blind technique, such a technique being particularly advantageous in terms of performance.

According to a particular feature, said at least one extraction parameter is associated with at least one insertion parameter used for the insertion of said second watermarking message in the second multimedia entity.

This is because the extraction parameters for a message in a watermarked image are associated with insertion parameters which were necessary for the prior insertion of the message in the image.

According to one feature, prior to the step of extracting a first item of information from the first multimedia entity, the method comprises a step of readjusting said first multimedia entity with respect to said second multimedia entity, in order to allow extraction of said first item of information from said readjusted first multimedia entity.

The method according to the invention permits the use of algorithms of greater or lesser complexity for detecting watermarks or geometric readjustment.

According to one embodiment, said first multimedia entity is obtained from a network.

This is because the first multimedia entity may be present on a communication network, for example the Internet.

According to one feature, obtaining said first multimedia entity comprises a step of identifying the address on the network of said first multimedia entity and/or the address referencing said first multimedia entity.

The obtainment of the address of an image makes it possible to know the source of the image and to retrieve it if necessary.

According to one feature, the multimedia entities being images, the step of deciding as to the second match is followed by a step of producing a report containing a same scene indication if the decision as to the first match between the first multimedia entity and said second multimedia entity is positive and if the decision as to the match between the first and second items of information is negative.

At the outcome of the decision as to a second match between the first and second items of information, a report is issued. This report indicates that the two images represent the "same scene" if the result of the decision of first match is positive and if the information contained in the images is different.

According to one feature depending on the preceding feature, the measurement of the reliability of the decision as to the second match is associated with the same scene indication and corresponds to the first criterion of match reliability (C1).

Where the result of the decision as to a second match between the first and second images indicates that the images represent the same scene, the reliability associated with that decision is limited to the value of the first criterion of match reliability.

According to another feature, the step of deciding as to the second match is followed by a step of inserting a same image indication in the report if the decision as to the first match between the first multimedia entity and the second multimedia entity is positive and if the decision as to the match between the first and second items of information is positive.

The report indicates that the two images represent the "same image" if the result of the decision of first match is positive and if the information contained in the images is similar or even identical.

According to a feature depending on preceding feature, the measurement of the reliability of the decision as to the second match is associated with the same image indication and corresponds to the product of the first criterion of match reliability and the second criterion of match reliability.

According to one embodiment, the report comprises the address on the network of said first multimedia entity and/or the address referencing said first multimedia entity.

Thus, the owner of the second multimedia entity may retrieve and verify the similarity of his multimedia entity with a published multimedia entity.

According to one feature, the second multimedia entity forms part of a set of second multimedia entities.

Thus the verifying method according to the invention consists of verifying whether or not a first multimedia entity matches a second multimedia entity among a multitude of second entities.

According to one feature, prior to the step of obtaining a first criterion of match reliability, the method comprises a step of selecting, from the set of second multimedia entities, a plurality of second multimedia entities close to said first multimedia entity.

This selecting step makes it possible to verify the match of multimedia entities on second multimedia entities selected, which are of reduced number with respect to all the second multimedia entities of the set of second entities, this number preferably being fixed.

This thus simplifies the later processing operations.

According to an embodiment in which each multimedia entity comprises a plurality of units of interest, obtaining the first criterion of match reliability comprises the following sub-steps:

matching information on local content of the first multimedia entity with information on local content of the second multimedia entity, said information on local content being associated with units of interest, geometric matching of units of interest of the first multimedia entity with units of interest of the second multimedia entity, and defining, in one of the multimedia entities, a region comprising the units of interest resulting from the step of geometric matching;

said obtaining of the first criterion of match reliability being performed on the basis of the result of the steps of matching information on local content and of geometric matching over the defined region.

The principle of this embodiment relies on the creation of two types of matching, then the definition of a region making it possible to establish a measurement of match coherency between the two multimedia entities.

This division, associated with the use of techniques adapted to each of the steps, makes it possible to perform a measurement of coherency establishment linked to a first criterion of match reliability. This criterion being defined with respect to the matching steps performed between the two multimedia entities, it makes it possible to obtain a value of the first criterion of match reliability that is as accurate as possible as to the similarity, and thus enables good performance to be obtained in terms of number of match detections and false alarms.

According to one feature, with each multimedia entity there is associated at least one descriptor determined prior to the step of obtaining the first criterion of match reliability, said at least one descriptor associated with at least one unit of interest of the multimedia entity comprising at least one item of information on local content and at least one item of position information said at least one descriptor being used during the steps of matching information on local content and of geometric matching.

Association is thus made with each multimedia entity of at least one descriptor which is used for all the steps of the verifying method, without this requiring, during processing, the calculation of new descriptors.

According to other features, the step of matching information on local content of the first multimedia entity with information on local content of the second multimedia entity comprises the following steps:

for each item of information on local content of the first multimedia entity, selecting, from the information on local content of the second multimedia entity, information substantially dose to the item of information on local content concerned, so defining a first set of matches of which each forms a pair between the item information on local content concerned of the first entity and one of the items of information substantially close to the second entity.

for each item of information on local content of the second multimedia entity, selecting, from the information on local content of the first multimedia entity, information substantially close to the item of information on local content concerned, so defining a second set of matches of which each forms a pair between the item of information on local content concerned of the second entity and one of the items of information substantially close to the first entity, determining the intersection of the first and second set of matches.

Thus, according to this step of the verifying method, the matching of the multimedia units of interest is performed on the information on local content, which has the advantage that the matching is possible even if the images have been reframed, the matching of information on local information being robust.

According to a feature depending on the preceding feature, selecting a set of matches for an item of information on local content concerned of a multimedia entity comprises the following steps:

calculating the distances between said item of information on local content concerned and each of the items of information on local content of the other multimedia entity, determining the distances less than a predetermined threshold, so defining the set of matches concerned.

Thus, according to these steps, units of interest are defined which seem similar according to the associated information on local content.

According to one feature, the step of geometric matching comprises the following steps:

determining a possible geometric transformation necessary to obtain the first multimedia entity from the second multimedia entity, determining a set of units of interest of the first and of the second entity for which the geometric transformation makes it possible to match a unit of interest of the first multimedia entity and a unit of interest of the second multimedia entity.

Thus, in order to improve the detection of the match of two multimedia entities, determination is made of the geometric transformation of the units of interest of the multimedia entities in order to identify the set of the units of interest of the multimedia entities which truly match geometrically according to the geometric transformation determined.

By this geometric transformation, it is then possible to deduce the matching units of interest.

More particularly, the step of determining a possible geometric transformation comprises estimating the geometric coherency between the items of position information associated with the matched items of information on local content.

According to one feature, obtaining the first criterion of match reliability is performed on the basis of the ratio between a probability that the first multimedia entity does not match one of the second multimedia entities and a probability that the first multimedia entity matches one of the second multimedia entities, these two probabilities being a function of the result of the matching steps.

In this manner the compromise between good detection and false alarms is expressed.

According to another feature, the ratio further comprises a thumbnail in which the region is defined that comprises the units of interest resulting from the geometric matching step.

According to one embodiment, prior to the step of obtaining the first criterion (C1) of match reliability, the method comprises the steps of:

obtaining at least one descriptor for each of the first and second multimedia entities, calculating a distance between the descriptors obtained.

According to this embodiment, the first criterion of match reliability depends on the distance between the descriptors of the multimedia entities.

According to one feature, obtaining the first criterion of match reliability is performed on the basis of the calculation of a probability of first match depending on the distance calculated.

According to a particular feature, the descriptor is obtained by the following steps:

obtaining division of the multimedia entity into at least a predetermined number of blocks, and for each block:

extracting at least one unit of interest, and storing the coordinates of said at least one unit of interest.

Thus a particularly compact descriptor is obtained whose calculation is particularly rapid. Due to the division into blocks and the obtainment of points of interest for each block resulting from the division, the image is described in a regular manner, which makes it possible to characterize both the regions with high variations of luminance as well as the smooth regions.

According to one feature, the calculation of a distance, between descriptors obtained from the first multimedia entity and from the second multimedia entity, is performed by adding, over the set of blocks obtained by dividing each multimedia entity, the distances between units of interest belonging to said spatially matching blocks.

According to another feature, the distance between units of interest by block is equal to the maximum distance between coordinates of the units of interest.

According to one feature, the calculated distance is equal to the minimum of the distances obtained after application, to one of the multimedia entities considered, of a geometric transformation belonging to a predetermined set of transformations.

Thus, the distance finally calculated takes into account a certain number of predetermined transformations, such as rotations through a right angle or reflections in vertical or horizontal axes.

According to one feature, the step of obtaining division comprises the steps of:

standardizing the size of the multimedia entity to a predetermined size dividing the standardized multimedia entity into said at least a predetermined number of blocks.

Thus, the possible changes of scale which images may undergo are automatically taken into account due to the standardization. Furthermore, the coordinates of the points of interest obtained after standardization have values belonging to an interval of values determined by the size of the standardized image, which makes it possible to know precisely the number of bits necessary for storing the descriptor.

According to one feature, a unit of interest is an extremum of a filtering operator.

According to one feature, the step of selecting a plurality of second multimedia entities close to said first multimedia entity comprises the following steps:

for each pair of first and second multimedia entities, the steps of obtaining descriptors and of calculating the distance associated with the method of the invention, and selecting second multimedia entities for which the distances with the first multimedia entity are the least.

According to another feature, the first criterion of match reliability further depends on the number of second multimedia entities of the set of second multimedia entities.

According to another feature, the predetermined threshold is a predetermined value ($P^0_{FA}$) of the probability of taking an erroneous decision as to the first match between the first multimedia entity and a second multimedia entity.

The object of the present invention is also to provide a device for verifying multimedia entities in which at least some of the drawbacks of the prior art mentioned above are overcome.

The device for verifying multimedia entities according to a first aspect of the invention to determine whether a first multimedia entity matches a second multimedia entity, is characterized in that it comprises:

means for selecting, by a content-based search, from a plurality of second multimedia entities, a set of second multimedia entities close to the first multimedia entity, and means for deciding as to at least one match between the first multimedia entity and at least one second multimedia entity of the set of second multimedia entities, based on a comparison between the first multimedia entity and the second multimedia entities of the set.

As the advantages and particular features specific to the device for verifying multimedia entities according to the invention are similar to those set out above concerning the method according to the invention, they will not be repeated here.

In a complementary manner, according to a second aspect the Invention also relates to a device for verifying at least one match between a first multimedia entity and a second multimedia entity, characterized in that the device comprises:

means for obtaining a first criterion (C1) of match reliability, means for comparing the first reliability criterion (C1) obtained with a predetermined threshold, means for deciding as to a first match between the first multimedia entity and the second multimedia entity adapted to decide as to the first match according to the result of the comparison, means for extracting a first item of information from the first multimedia entity, means for comparing between the extracted item of information and a second item of information of the second multimedia entity, means for obtaining a second criterion (C2) of match reliability, means for deciding as to a match between the first and second items of information adapted to decide as to the match according to the result of the comparison of items of information, means for deciding as to a second match between the first multimedia entity and the second multimedia entity adapted to decide as to the second match depending, on the one hand, on the decision of the first match between the first and second multimedia entity and, on the other hand, on the decision as to a match between the first and second items of information, and means for determining a measurement of the reliability of the decision as to the second match adapted to determine the measurement of the reliability of the decision depending on at least one of the first and second match reliability criteria.

This device has the same advantages as the verifying method according to a second aspect of the invention briefly described above.

According to other aspects, the invention also concerns an information processing device adapted to operate as a device for verifying multimedia entities such as the one described briefly above, a telecommunications system, a device for storing multimedia entities, an data carrier readable by a computer system as well as a computer program for an implementation of the method according to the invention briefly described above.

The methods and devices for verifying multimedia entities according to the invention will also find applications in the verification of items of text, forming multimedia entities or other multimedia content.

Other features and advantages of the present invention will appear on reading the following description of a number of forms and embodiments of the methods and devices for verifying multimedia entities according to the invention, with reference to the accompanying drawings, among which:

FIG. 20 represents a table setting out all the geometric transformations considered for the calculation of the distance according to the invention.

Figure 1:
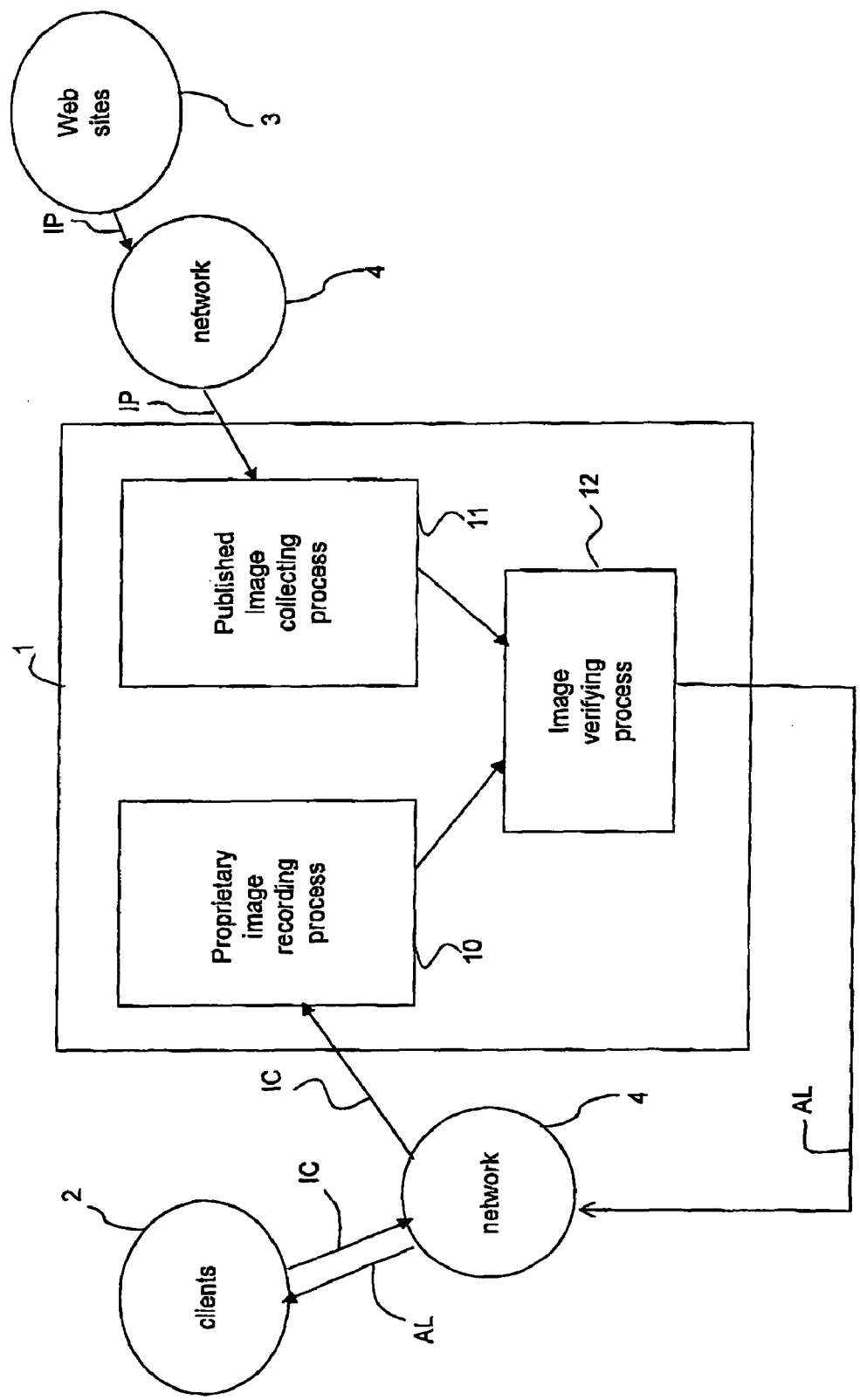
FIG. 1 shows an overall view of a device for verifying multimedia entities according to the invention in which processing processes implanted in the device appear.

With reference to FIG. 1, the image verifying device 1 according to the invention receives as input reference multimedia entities, for example proprietary images IC to protect which are provided by clients 2 and request multimedia entities, for example published images IP which are published on Web sites 3. The device 1 has the task of comparing the images IP with the images IC.

In this embodiment, the images IC and IP are transported to the device 1 over a communication network 4, for example the Internet network. In other embodiments, the images IC and IP may be loaded into device 1, for example from a diskette or CD-ROM.

The image verifying device 1, according to the invention, supplies as output an alarm or warning item of information AL when a published image IP has a high level of similarity with a proprietary image IC recorded on device 1. The detection of a high level of similarity for a published image IP indicates a high probability that the images IP and IC are the same.

The main processing methods integrated and implemented in the device 1 for verifying images are illustrated in FIG. 1. These processing processes comprise in particular a process 10 for recording proprietary images, a published image collecting process 11 and an image verifying process 12.

The proprietary image recording process 10 will now be described more particularly with reference to FIG. 2.

The proprietary image recording process 10 commences with a step S100 relating to the loading of a proprietary image IC in device 1. The proprietary image IC for example comes from a digital camera or a scanner.

After loading of the proprietary image IC, at step S101 there is generated a unique identifier ID for the proprietary image IC. The generation of the identifier ID is, for example, performed by incrementing an internal counter of the device 1, by timestamping, by image signature, or by any other known technique enabling a unique identifier to be generated.

Step S101 also performs a recording of metadata MD associated with the proprietary image IC. The metadata MD comprise for example the name of the owner of the image IC, the dimensions and the format or the image (jpeg, gif, etc.), but also "user" data of any kind which may be associated with the image, such as fields describing the content of the image. The metadata MD are stored in a text database 100*m* of conventional type, via a database management system (DBMS) such as postgresql, mysql, oracle, etc. (registered trademarks).

In one embodiment of the device 1, a decision process may be based on detection of watermarking in the images, and steps S103 to S106 are thus present in order to perform the corresponding watermarking in the images.

Such a decision process is integrated into the image verifying process 12 and will be described in more detail below.

At the following step S103, in order to watermark a proprietary image IC, the process 10 generates the following watermarking information: a secret key CS, a pseudorandom sequence SPA, a message ME, and the type ALGO of the watermarking algorithm used. The characteristics of these items of watermarking information, such as the sizes of the CS key, of the message ME, etc., are independent of the watermarking technique used. In known manner, the pseudo-random sequence SPA is preferably generated from the secret key CS.

When extraction of a watermark is preferred using a so-called non-blind technique, step S103 also comprises the generation of an insertion parameter PI used for watermarking the message in the proprietary image, and an extraction parameter PE used on extraction of the message in the proprietary image.

These insertion and extraction parameters characterize the adaptation of the watermarking to the image.

They are used for an optimal extraction of the message from within the image. The use of these parameters enables an extraction of the message from an image to be performed with a so-called non-blind technique, such a technique being particularly advantageous in terms of performance.

This watermarking technique which adapts the insertion to the image, also referred to as "using side information", is described in the article entitled "Perceptual watermarking of non I.I.D signals based on wide spread spectrum using side information" by G. Le Guelvouit, S. Pateux, and C. Guillemot, which was published at the IEEE ICIP 2002 conference.

At the following step S104, the watermarking information CS and ME are stored in the base 100*m*. This CS and ME information is used later in the image verifying process 12.

On using a non-blind watermarking technique, the insertion and extraction parameters PI and PE associated with an image are also stored in the base 100*m*. This information is also used later on during the verification process, for its optimization.

The insertion of a watermark MA in the proprietary image IC is performed at step S105. The watermark MA is generated depending on the pseudo-random sequence SPA, and may also depend on the message ME.

Step S106 sends watermarked images back to the clients 2 including watermarks MA and corresponding to the proprietary images IC. The proprietary images IC published by the clients 2 are those comprising the watermarks MA.

A step S107 is provided in order to extract by calculation visual descriptors DE characterizing the proprietary image IC whether watermarked or not. In accordance with the invention, a plurality of N visual descriptors DE may be calculated and they may be of different types. So-called "global" descriptors and/or so-called "local" descriptors are used in this embodiment. The descriptors are, in particular, associated with units of interest of the image, one unit of interest being, for example, a point of interest. However, it is clear for the person skilled in the art that other techniques for image description may be employed.

An indexing step S108 is next provided and consists of storing the visual descriptors DE in a base 100*d* of proprietary image descriptors. Different types of indexing may be carried out, for example, those based on a sequential storage, a structured storage in classes or a storage in the form of a tree structure.

A step S109 is executed in parallel with step S108 and consists of verifying that the proprietary image recorded with the set of bases 100 has not already been collected, for example on the web, by the device.

For this, a database 100*w* is provided in order to store a set of published images collected by the device.

Thus step S109 consists of searching in the base 100*w* to determine whether the proprietary image in course of being registered has already been published. This process is detailed below with reference to FIG. 7.

Advantageously, this verification gives greater flexibility to the system. This is because it is possible to make a late registration of a proprietary image, while still having the possibility of verifying whether or not that proprietary image has been published. Thus an image published before it has been recorded in the device can be detected.

Steps S103 to S106 described below are optional and may be absent in certain embodiments.

This is because, in the case of the recording of images that are already watermarked, steps S103, S105 and S106 are absent. However step S104 can be kept in order to allow registration in the base of metadata 100*m* of the information necessary for the extraction of the message from the proprietary image, as well as the message itself.

According to a variant embodiment, the initial proprietary image IC, that is to say that received at step S100, is also stored in the device 1, in the form of a summary such as a thumbnail.

Figure 2:
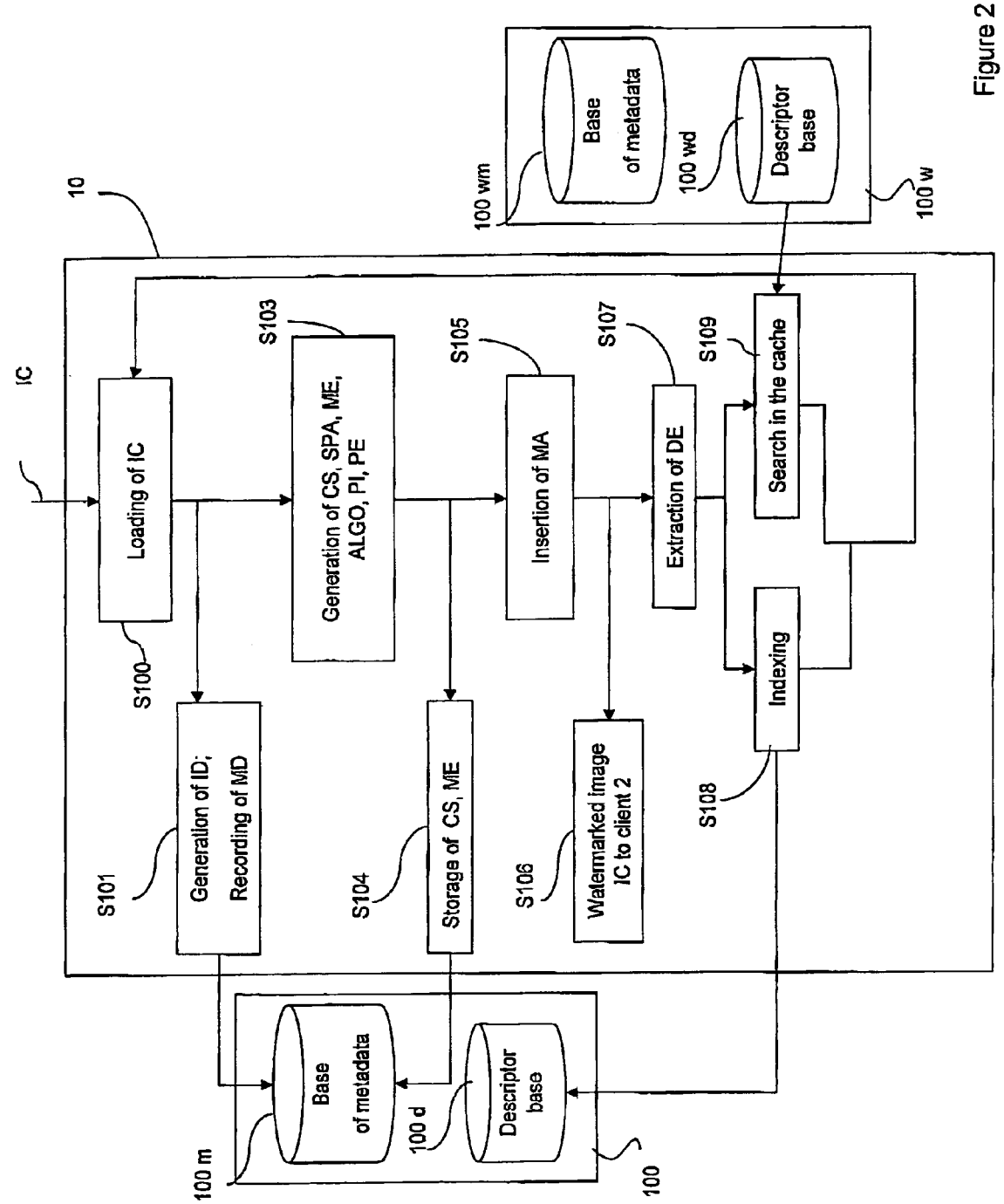
FIG. 2 is a functional flow diagram showing a process for recording digital images implemented in the device for verifying digital images of FIG. 1.

As shown in FIG. 2, for reasons of convenience of description, the bases 100m and 100d are here considered as components of a more general database 100 designated "proprietary image base". The proprietary image base 100 comprises all the data and information processed by the device 1 which relate to the proprietary images IC.

Similarly, the bases 100wm and 100wd are considered as components of the more general database designated as "published image base" 100w. The published image base 100w comprises all the data and information relating to a set of published images IP. The base 100wd comprises the descriptors of the published images. The base 100wm is a base of conventional type containing the metadata of the published images, managed via a database management system (DBMS) device.

This set is only a portion of the published images collected by the device.

This is because the collection of published images can include a high number of images and so the storage of this high number of cannot be envisaged. Thus only a portion of the collected images is stored.

For example, provision may be made to store either images collected over a specific number of past days, or a predetermined number of collected images, or images collected after a given date, so very considerably limiting the volume of data to be stored.

Figure 3:
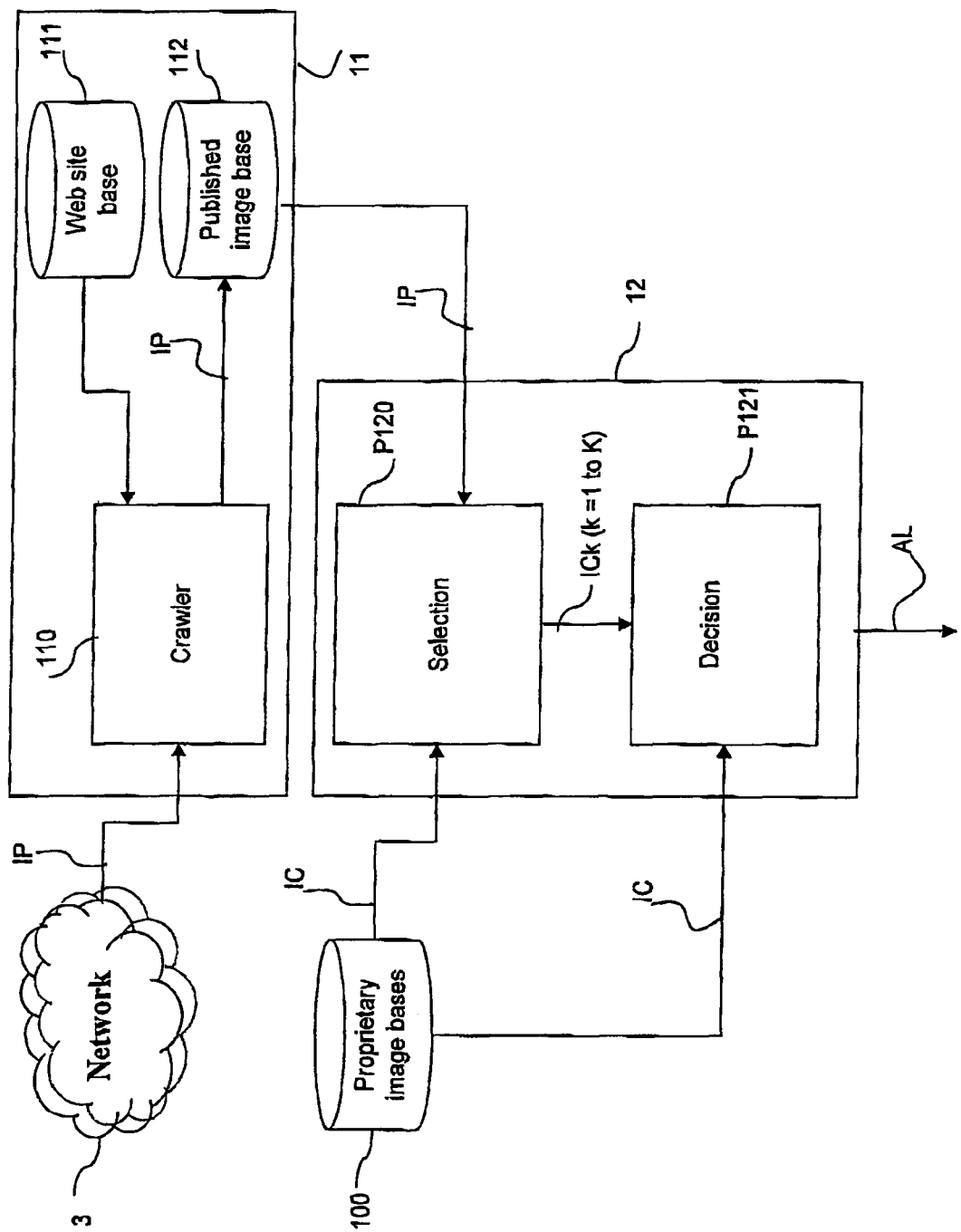
FIG. 3 is a general functional flow diagram showing a method of verifying digital images according to the invention.

With reference to FIG. 3, a general description will now be given of the published image collecting process 11 and the image verifying process 12.

In this embodiment, the published images IP are retrieved from Web sites 3 of the Internet network.

The published image collecting process 11 may for example use a crawler 110. A base 111 provides the crawler 110 with the addresses of the Web sites 3 to monitor on the network. The crawler 110 goes through the Web sites 3 indicated by the base 111 and, for each site, retrieves the published images IP presented on that site. Different techniques may be used by the crawler 110. For example, the crawler 110 may follow hyperlinks present on the different Web pages of the site in order to retrieve a maximum of images. Software products known to the person skilled in the art, such as "Memoweb" or "Teleport Pro" (registered trademarks), may be used for the crawler 110.

The published images IP collected by the crawler 110 may, for example, be stored in a published image base 112.

The function of the image verifying process 12 is to determine whether a published image IP collected on a Web site 3 matches one of the proprietary images IC recorded in the base 100.

The process for verifying images 12 comprises in particular a selecting process P120 and a deciding process P121 which are represented in FIG. 3.

The function of the selecting process P120 is to select a limited number of proprietary images IC for each published image IP collected by the crawler 110. K proprietary images IC1 to ICK are thus selected by the selecting process P120.

The selecting process S120 employs search techniques performing a search based on the content in order to select the K proprietary images IC1 to ICK that are closest to a published image IPt in course of processing. The closeness of the two images IP and IC must here be understood in terms of the visual similarity between them.

Among content-based search techniques performing a search in particular based on visual similarity, it is for example possible to employ known techniques making use of global descriptors and of distance measurements, or of local descriptors and of an associated search technique.

Thus, the selection is performed on the basis of description information of the images, and, to that end, a description of the published image is calculated. Concerning the set of proprietary images, the descriptions corresponding to these images are indexed in the base 100 of proprietary images.

The descriptions of the images are modeled by means of one or more local and/or global descriptors.

Thus, the selection process makes provision for calculating one or more descriptors d_IP characterizing the published image IP.

Thus, in accordance with the invention, one or more $N_{ip}$ descriptors d_IP may be calculated, and these may be of different types. Each type of descriptor will be used in parallel in the different steps.

For example, the descriptors comprise at least one descriptor of global type and/or at least one descriptor of local type.

According to the level of precision desired in the selecting step, a number of options as to the choice of descriptors are possible.

The selecting process next provides for searching for the K images IC, that is to say a plurality of second multimedia entities, of the set of proprietary images, that is to say of the set of the second multimedia entities, which are the closest to IP according to the descriptions of the images.

The K selected proprietary images ICk (k=1 to K) are identified by their respective unique identifiers IDk (k=1 to K) and may be sorted in descending order using a measurement of similarity with the published image IP. Naturally, if a measurement of distance between descriptors is used instead of a measurement of similarity, the sorting operation is made in an increasing order. However, to make matters simple, reference will be made to similarity in the following description.

The deciding process P121 next compares each published image IP with the selected proprietary images ICk (k=1 to K). It is thereby possible to limit the number of deciding steps and to significantly reduce the calculation load for the image verifying process 12.

The function of the deciding process P121 is to decide whether a published image IP is sufficiently close to a proprietary image IC to justify the generation of an alarm or warning AL for the attention of the client 2 concerned. To that end, the deciding process P121 performs calculations of comparison on the published image IP and the proprietary images ICk (k=1 to K) selected by the selecting process P120, in order to determine whether the published image IP matches one of the selected proprietary images ICk (k=1 to K).

When the published image is considered as being the matching proprietary image ICk of the base 100 of proprietary images an alarm AL is generated.

Figure 4:
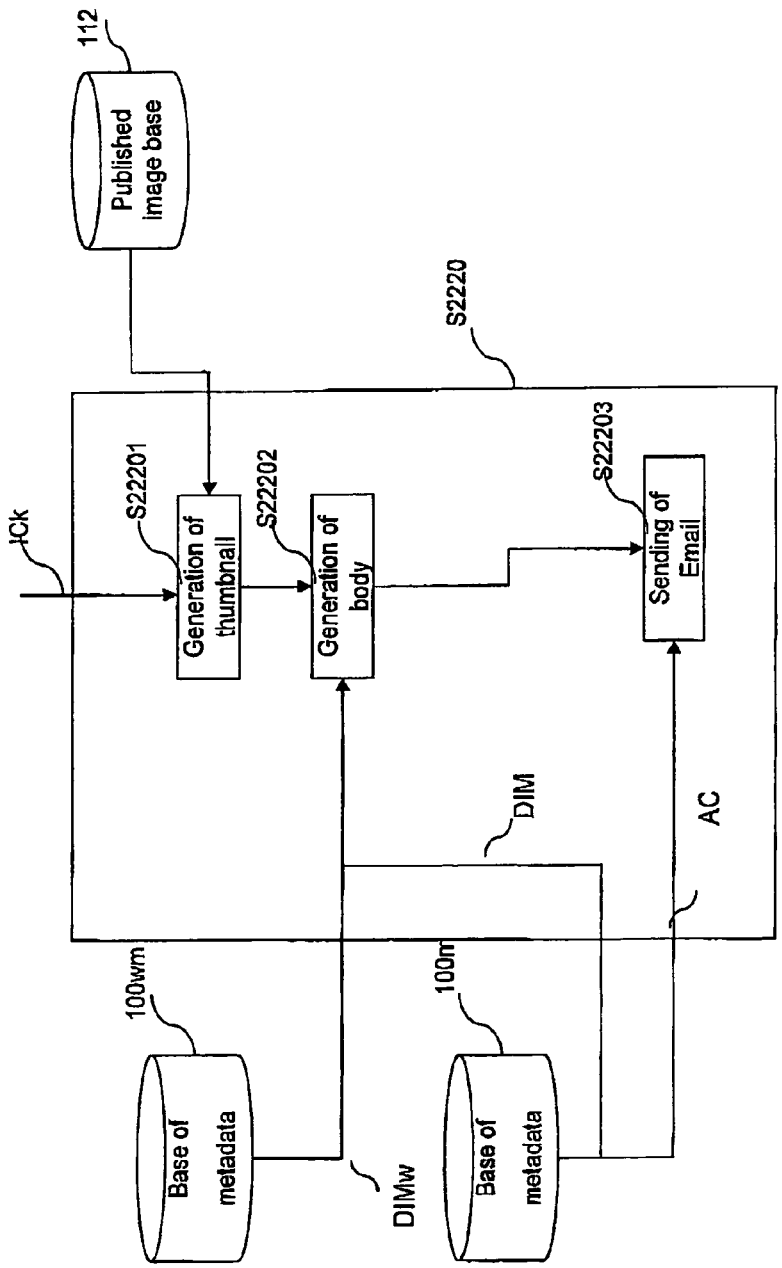
FIG. 4 is a functional flow diagram showing the generation of alarms further to the deciding process, implemented in the device for verifying digital images of FIG. 1.

With reference to FIG. 4, the generation of the alarm report and of the alarms is now described, and in particular the use of metadata for generating the content thereof.

The alarm is sent, for example, in the form of an electronic message automatically generated. That alarm contains, for example, a thumbnail representing the proprietary image, and a hyperlink to the web page on which the published image has been found, that hyperlink referencing, in particular, the published image.

The alarm may also contain information (date and time) about the time at which the detection was made. Finally, the alarm may contain identifiers of the proprietary image, in order for the owner himself to be able to verify that the published image really does correspond to his image.

For this, step S22201 provides for creating a reduced representation of the proprietary image for the purpose of inserting it in the alarm report. This report may, for example, take the form of an HTML file which makes it possible both to economize on the user's bandwidth as well as making the appearance of the alarms uniform.

Next, step S22202 provides for producing the report which will be sent to the owner. This report, which in particular is organized in the form of a file, contains the information relative to the image DIM of the owner, and the information relative to the published image DIMw.

In particular, provision is made to cite the URL of the published image in the report and the web page on which the image has been detected. The report can also contain a hyperlink enabling the owner of the protected image to view with ease the web page on which is published the image similar to his image.

Furthermore, the alarm may contain one or more visual descriptors of the image.

Finally, at step S22203, the report is sent to the owner of the protected image, the email address AC of whom being retrieved from the metadata base 100*m*.

A first aspect of the invention will now be described.

A embodiment S120 of the selecting process will now be described in more detail with reference to FIG. 5.

For this, a step S1200 is provided at the beginning of the selecting process S120 in order to extract one or more descriptors DEt which characterize the published image IPt.

The technique of extracting the descriptors DEt is similar to that used in the proprietary image recording process 10. Possibly, one or more descriptors among N descriptors usable in the image verifying device according to the invention may be selected. The extracted descriptors DEt are next used at a step S1201.

Prior to step S1200, the metadata concerning the images collected on the web can be recorded within the published images base. This information contains in addition the name of the image, its address on the web (URL), the web address of the page on which the image is to be found, the date the collection was made, dimension information and the image type.

This information is used later, when a similarity has been noted between a published image and a proprietary image, in order to generate the alarms and the reports of a match or non-match between a first image and a second image.

Prior to step S1201, step S1205 may be implemented in order to index the descriptors calculated on the image published in the published image base. Similarly, at step S108 of FIG. 2, different types of indexing are possible. The descriptors so indexed enable rapid searching at step S109. Thus, the base of the published images also comprises a base 100*wd* containing the descriptors of the published images, which are used at the detection step.

At step S1201, a search is made in the base of indexed descriptors 100*d*. Descriptors DEc that are the closest to the descriptors DEt are extracted from the base 100*d*, The extracted descriptors DEc are those matching the selected proprietary images ICk (k=1 to K), identified by their respective unique identifiers IDk (k=1 to K). The selected proprietary images are sorted in decreasing order on the basis of a measurement of similarity with the published image IPt.

When descriptors of different types are used conjointly (for example in parallel), the closest images corresponding to the different types of descriptors are grouped together and any redundant images are eliminated.

A step S1202 initializes a results base 1203 by storing therein the results obtained at step S1201. Thus, for example, for each proprietary image ICk (k=1 to K), a line is described in the results base 1203, comprising the identifier IDt of the published image IPt, the identifier IDk of the proprietary image ICk, and a search score, that is to say a similarity measurement MSk.

In the case of global descriptors DEG, the similarity measurement MSk may for example be the inverse of a distance between the global descriptors DEGt of the published image IPt and the global descriptors DEGc of the proprietary image ICk.

In the case of local descriptors DEL, the similarity measurement MSk may for example be the number of paired local descriptors (DELt, DELc) between the images IPt and ICk.

In the case in which several description techniques are combined, it is possible to use a combination of several similarity measurements.

According to a particular embodiment, step S1202 may include the initialization of an item of geometric transformation information Tk. This item of information describes the geometric transformation of the image of which the identifier is IDt and which minimizes the distance to the image IPt.

For example, the descriptor described in the document FR 0304595 makes it possible to know, for example, what rotation through 90° or axial reflection of the image IDk is the closest to the image IPt.

This item of information thus stored in the results base is re-used at the step of geometric readjustment.

When the selection process S120 has finished its processing for the published image IPt, the status of the published image IPt is modified in the base of published images 112 (step S1203). This modification of the status of the published image IPt indicates to the decision process that the selection is terminated.

Figure 6:
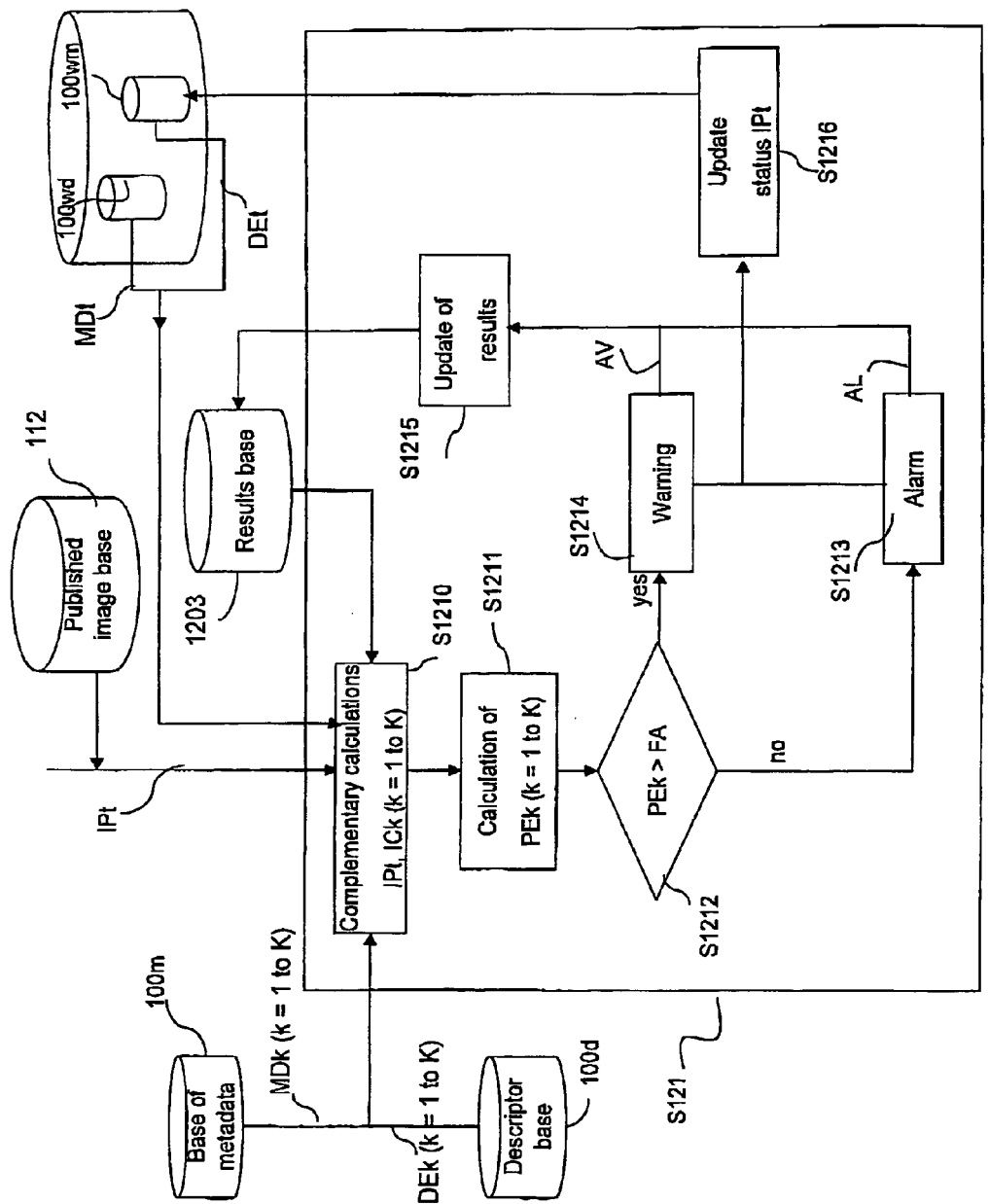
FIG. 6 is a functional flow diagram showing a first embodiment of a deciding process implemented in the device for verifying digital images of FIG. 1 according to the first aspect of the invention.

The decision process is now generally described with reference to a embodiment S121 illustrated in FIG. 6.

The decision process S121 commences with a calculation step S1210.

At step S1210, in order to perform the processing corresponding to the published image IPt, the decision process S121 retrieves from the base of published images 112 the published image IPt in course of processing and, from the metadata base 100*m*, the information relating to the selected proprietary images ICk (k=1 to K).

The process may also retrieve the information relating to the image to be processed in the metadata base 100*wm*, as well as the descriptors of the current image in the base 100*wd*. No calculation of supplementary descriptions thus needs to be provided.

Next, the decision process performs complementary calculations on the published image IPt and the selected proprietary images ICk (k=1 to K), as a complement to those performed at the selecting step S120. The complementary calculations comprise for example an attempt at geometric readjustment of the published image IPt, or the extraction of a watermark MA.

A step S1211 follows step S1210 and calculates a value PEk (k=1 to K) characterizing the pertinence of the match, for each of the selected proprietary images ICk (k−1 to K). This value PEk (k=1 to K) may for example, in the case of watermarked images, be the percentage of erroneous bits between the extracted image MEk and the expected image relative to the image ICk.

At a conditional step S1212, the match error PEk (k=1 to K) is next compared to a threshold FA which may in the case of the watermarking of images be calculated as a function of a given false alarm rate for the decision process S121.

Where the value PEk (k=1 to K) is less than the threshold FA, the decision process S121 generates, at a step S1213, an alarm AL for the attention of the client 2 concerned. The alarm AL is for example sent immediately by email to the client 2.

When the value PEk (k=1 to K) is greater than the threshold FA, it is a simple warning AV which is generated by the decision process S121 at a step S1214.

A step S1215 next enables the results base 1203 to be updated by recording therein the results obtained in the preceding steps S1210 to S1212.

At following step S1216 enables updating of the status of the published image IPt in the base of published images 100wm. The published image IPt then takes an "inactive" status or a "found" status. The "inactive" status is recorded in the base 112 if no match has been shown up by step S1210 between the published image IPt and a proprietary image IPk (k=1 to K). The "found" status is recorded in the base 112 if a match has been found by step S1210 between the published image IPt and a proprietary image IPk (k=1 to K).

Figure 7:
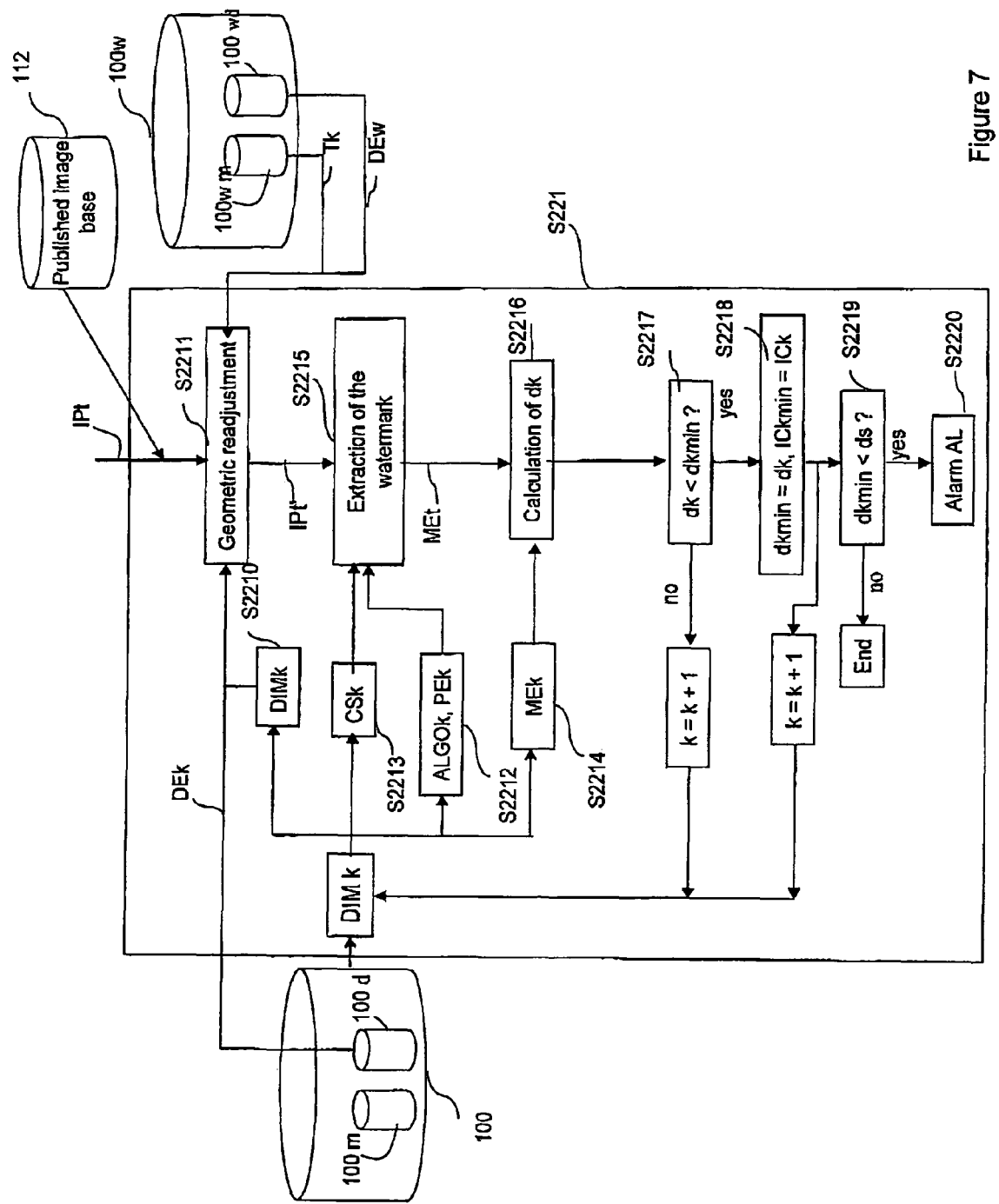
FIG. 7 is a functional flow diagram showing a second embodiment of a deciding process implemented in the device for verifying digital images of FIG. 1 according to the first aspect of the invention.

With reference to FIG. 7, an embodiment S221 of the decision process is now described in which the techniques of geometric readjustment and/or watermarking extraction are used.

The decision process S221 is adapted to the case in which the steps S103 to S106, relating to the watermarking of the proprietary images IC, are actually integrated into the process 10 of recording proprietary images described with reference to FIG. 2. This is because, in such a case, it must be determined whether the published image IPt comprises one of the watermarks inserted in the selected proprietary images ICk (k=1 to K).

As represented in FIG. 7, at step S2210, image data DIMk, relating to a selected proprietary image ICk (k=1 to K), are retrieved by the decision process S221 from the base 100 of recorded images. This step may also consist of retrieving the descriptors DEk from the base 100d that relate to the selected proprietary image.

For example, the image data DIMk do not reproduce all the information contained in the original proprietary image ICk, that is to say in the image provided by the client 2 and watermarked by the process 10 of recording images. The image data DIMk are for example constituted by a low resolution version of the original proprietary image ICk, namely a thumbnail, or by a set of points of interest of the image in the form of a set of coordinates of points, or still more simply, by the dimensions of the original proprietary image.

The image data DIMk comprise, for example, a thumbnail corresponding to the original proprietary image ICk as well as the dimensions of the original proprietary image ICk.

The image data DIMk are transmitted at a step S2211 which also receives the published image IPt from the base 112 of published images. Information stored in the base 100w may also be used. In particular, the information on geometric transformation Tk resulting from step S1202 of FIG. 5 coming from the base 100wm and the descriptors DEw coming from the base 100wd of the published images may be used. Step S2211 performs a geometric readjustment of the published image IPt using the image data DIMk and delivers a readjusted published image IPt'. Thus, for example, if the published image IPt had undergone a change of scale, the published image IPt may be re-dimensioned to its original size on the basis of the image data DIMk. If, in addition, the image IPt has been reframed, then the geometric readjustment consists of re-synchronizing the published image IPt with the proprietary image ICk.

It will however be noted that the readjustment performed at step S2211 is not always necessary and depends on the watermarking algorithm used. As shown in FIG. 7, a step S2212 is provided in order to retrieve the information ALGOk, relating to the type of the algorithm, from the proprietary images base 100 and the extraction parameters PEk generated during step S103 of FIG. 2. The information ALGOk is provided at step S2211, such that the latter may decide whether it is appropriate or not to perform a geometric readjustment. The extraction parameters PEk are used to perform non-blind extraction of the message contained in an image.

In addition to step S2212, steps S2213 and S2214 are also provided in order to retrieve other metadata MDk from the property image base 100. Steps S2213 and S2214 permit reading of the secret key CSk used in the watermarking algorithm and of the message MEk inserted in the proprietary image ICk.

The secret key CSk and the information ALGOk are supplied to a step S2215 which also receives the published image IPt'. Step S2215 ensures the extraction of a message MEt contained in the published image IPt' using the information CSk and ALGOk. A non-blind extraction can also be performed by the use of the parameters PEk specific to the image, indexed by k. A non-blind extraction gives better performance than the blind watermark extraction methods.

At a step S2216, the messages MEk and MEt are compared and a binary distance dk between them is calculated.

A step S2217 compares the binary distance dk to a minimum distance dkmin. The distance dkmin is equal to the smallest of the binary distances dk calculated from the proprietary images ICk already processed among the set of the K proprietary images IC1 to ICK. The distance dkmin is thus the binary distance calculated for a proprietary image ICkmin which at this stage of the decision process S221 is the closest to the published image IPt.

In the case in which dk>dkmin, the proprietary image ICk in course of processing is further from the published image IPt than the proprietary image ICkmin. The decision process S221 has then terminated the processing of that proprietary image ICk and the following image ICk+1 is next processed by a new execution of the steps S2210 to S2217.

In the case in which dk<dkmin, the decision process passes to a following step S2218 in which the value of dk is set to dkmin (dkmin=dk) and the proprietary image ICkmin closest to the published image IPt is then determined as being the current property image ICk (ICkmin=ICk).

Once the processing of the K proprietary images IC1 to ICK by steps S2210 to S2218 has been terminated, the proprietary image ICkmin identified at step S2218 is the closest image to the published image IPt among the K proprietary images IC1 to ICK. At a step S2219, the distance dkmin associated with the proprietary image ICkmin is compared to a threshold distance ds.

At step S2219, if the distance dkmin is greater than the threshold distance ds, the decision process S221 terminates without any of the proprietary images ICk (k=1 to K) having been considered as sufficiently close to IPt to give rise to an alarm AL. In the opposite case, if the distance dkmin is less than the threshold distance ds, a step S2220 is performed in which an alarm AL is generated and sent to the client 2 concerned. In this last case the image IPt is considered as being a watermarked image incorporating the message MEkmin of the proprietary image ICkmin.

A step may be provided in order to retrieve from the metadata MDk recorded in the base 100 of proprietary images an email address of the client 2 to which the alarm AL must be sent. Preferably, the alarm AL indicates to the client 2 the address of the web site 3 where the image of the client 2 was found.

According to a variant, the decision process S221 does not perform any watermark extraction. As indicated earlier, this is the case in particular when the proprietary image IC recorded has not been watermarked, that is to say, when the optional steps S103 to S106 of FIG. 2 are not carried out. In this variant, the decision relies on a geometric reframing operation, which is performed here in all cases, and on a measurement of the quality of the match made.

The use of points of interest in the image makes it possible in particular to perform a robust match termed feature-based registration as described for example in the article entitled "*MLESAC: A new robust estimator with application to estimating image geometry*" by P. Torr and A. Zisserman, CVIU, vol. 78, pages 138 to 156, year 2000. For each proprietary image ICk (k=1 to K), a match error measurement is then determined. In a similar manner to the operation described with reference to steps S2217 to S2220, when a minimum value of the match errors for the K proprietary images IC1 to ICK which are closest is less than a predetermined threshold, then the published image IPt is considered as being the matching proprietary image ICk of the base 100 of proprietary images and an alarm AL is generated.

Figure 8:
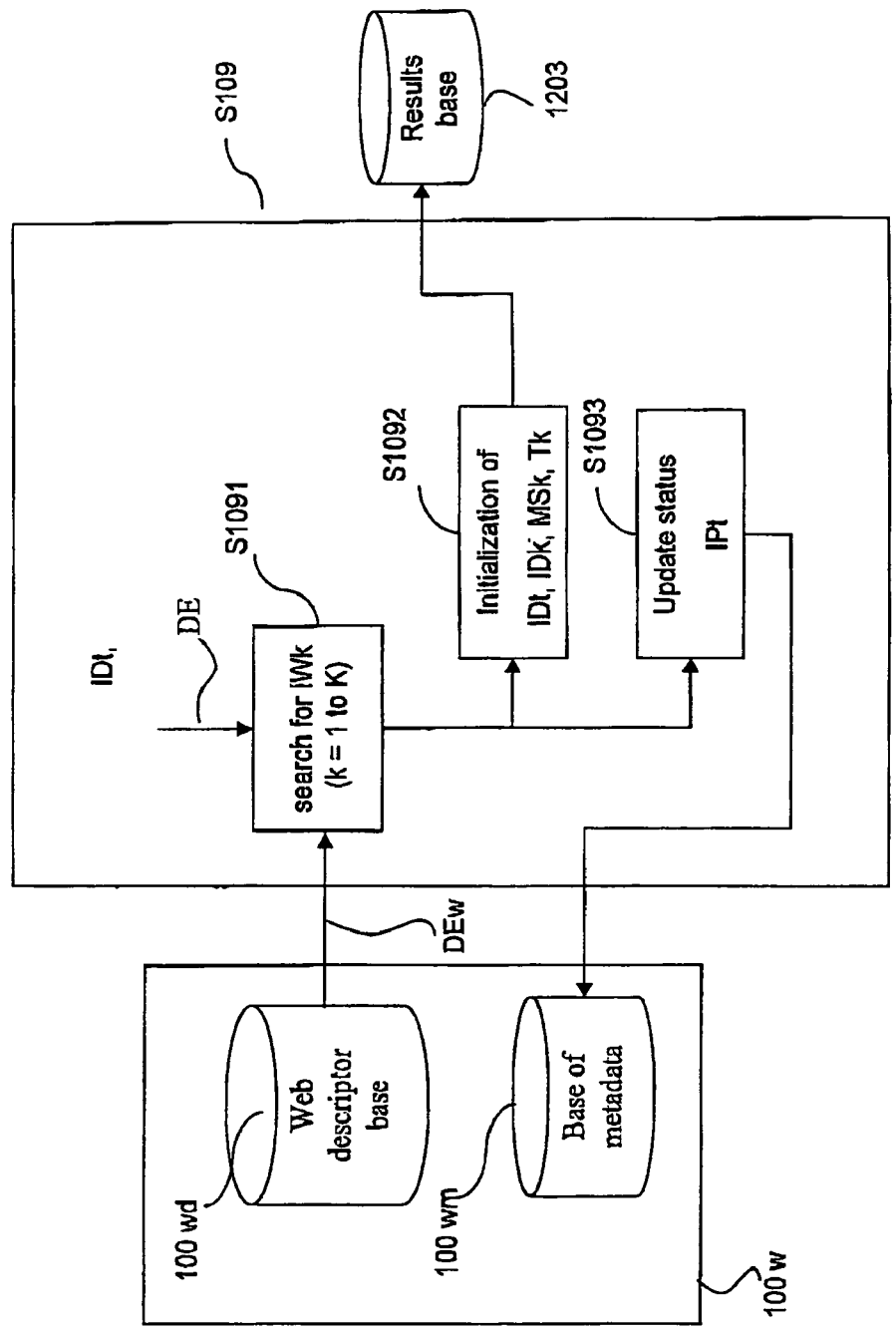
FIG. 8 is a functional flow diagram making it possible on inserting a proprietary image to verify that said image has not already been collected.

With reference to FIG. 8, the operation of the step S109 presented in FIG. 2 is described in more detail. That step is similar to step S120 of FIG. 5 apart from the fact that the search for the descriptions DE of proprietary images is performed in a base 100wd of published image descriptors, and not the other way round.

Figure 5:
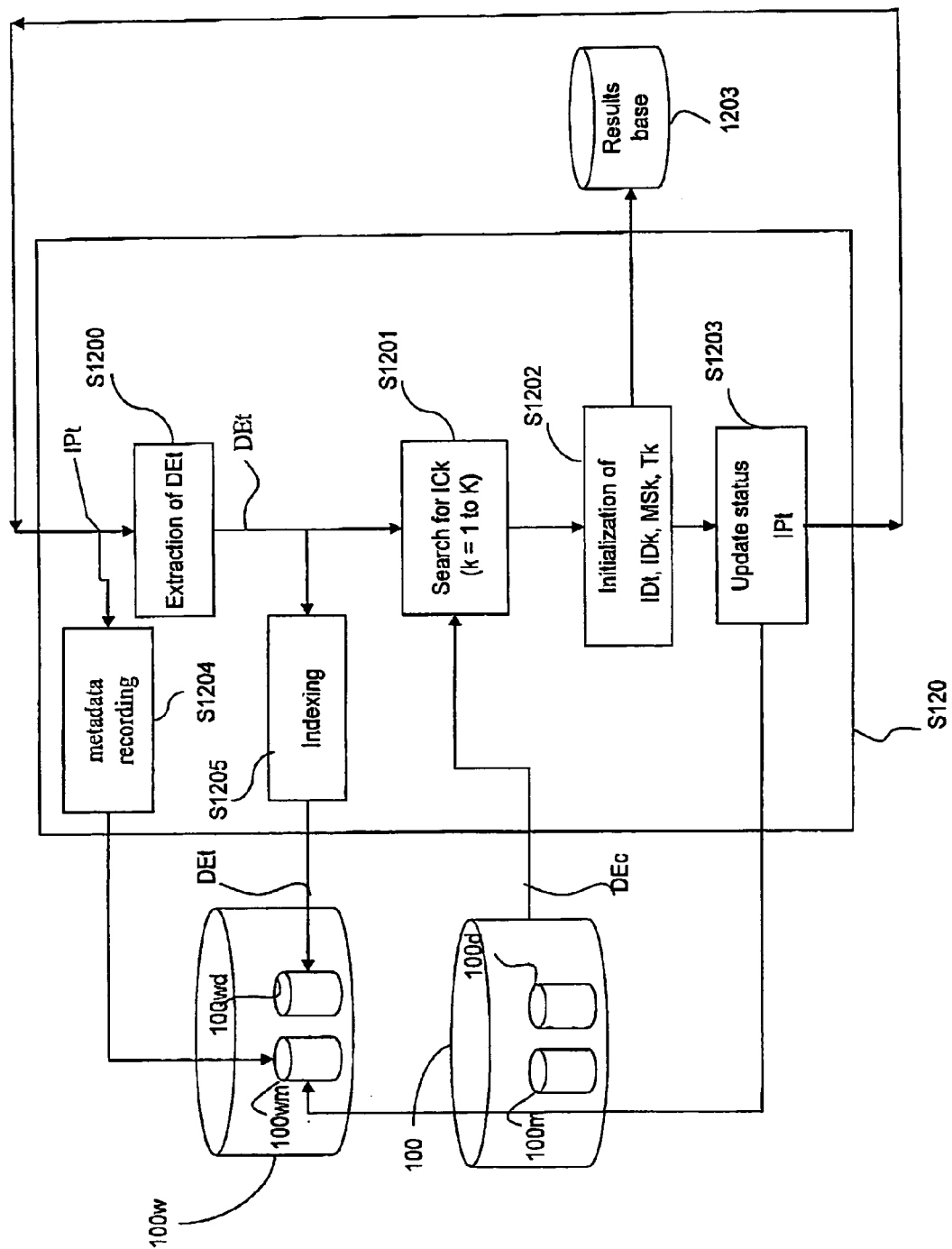
FIG. 5 is a functional flow diagram showing a process for selecting digital images implemented in the device for verifying digital images of FIG. 1 according to a first aspect of the invention.

Thus at step S1091, in a manner symmetrical to step S1201 of FIG. 5, a search is performed in the base 100wd of indexed descriptors. Descriptors DEw that are the closest to the descriptors DE are extracted from the base 100wd. The extracted descriptors DEw are those matching the selected published images IWk (k=1 to K).

A step S1092 initializes the results base 1203 in similar manner to step S1202 of FIG. 5. Thus, for example, for each image IWk detected, a line is written in the results base 1203. Thus the identifiers IDt and IDk are stored as well as the score MSk, and, optionally, the geometric transformation Tk.

In similar manner to step S1203 of FIG. 5, at step S1093 the state of the detected published image is modified. This modification indicates to the system that this image must undergo a deciding step in accordance with step S121. This is because, given the fact that a new proprietary image has been inserted in the base 100d, the published image has been rendered suspect. At the issue of this new decision, an alarm may be generated.

Figure 9:
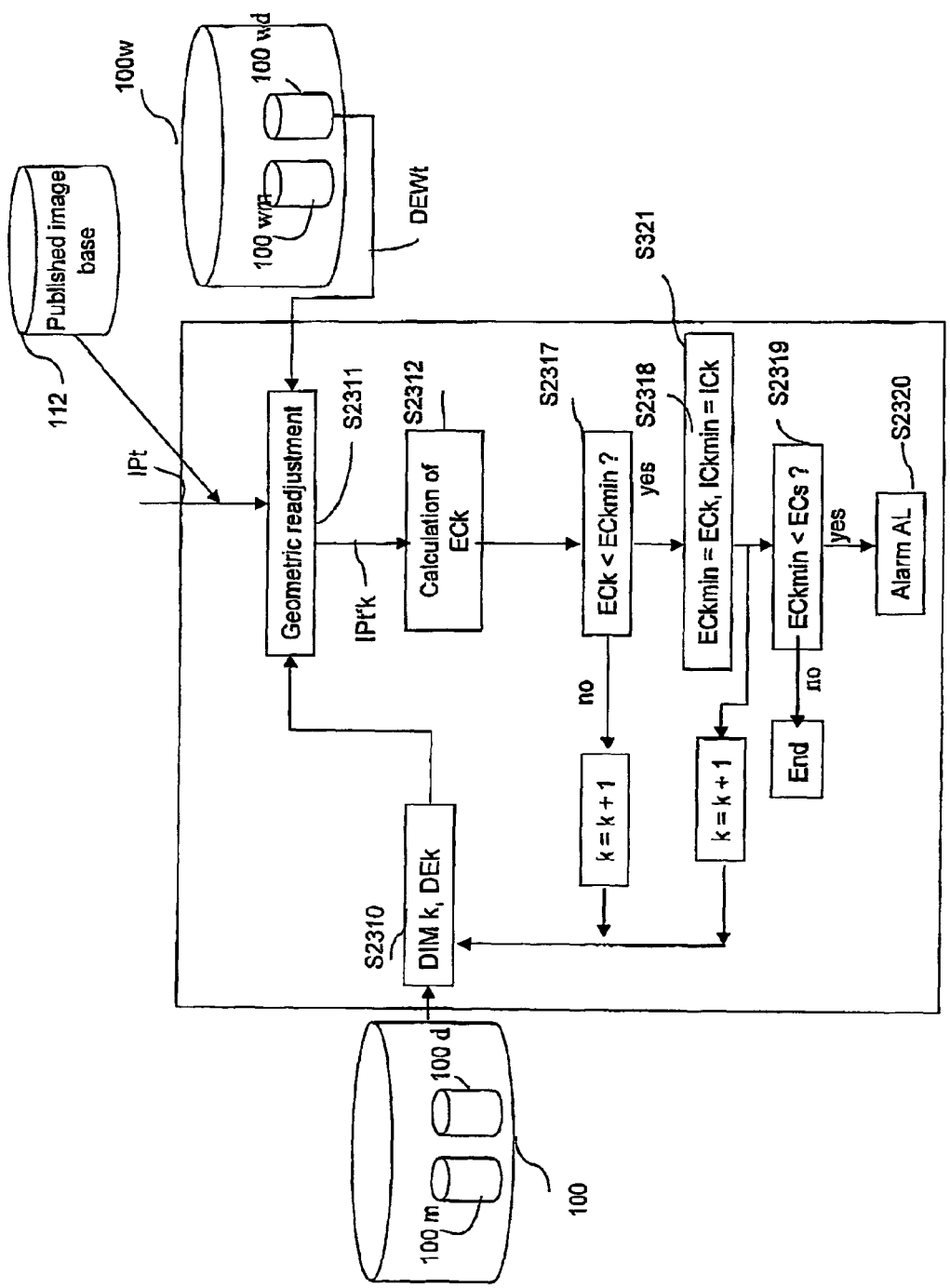
FIG. 9 is a functional flow diagram showing an embodiment of a deciding process without use of the watermarking of images, implemented in the device for verifying digital images of FIG. 1.

With reference to FIG. 9, a variant S321 is described of the deciding step S221 of FIG. 7, during which no watermark extraction is performed.

As indicated earlier, FIG. 9 presents the case where the proprietary image IC recorded has not been watermarked, that is to say, that the optional steps S103 to S106 of FIG. 2 are not carried out.

In this variant, the decision as to whether a published image IP is sufficiently close to a proprietary image IC relies on both a geometric reframing operation, which is performed in all cases, as well as on a measurement of the quality of the match made.

As represented in FIG. 9, at step S2310, image data DIMk, relating to a selected proprietary image ICk (k=1 to K), are retrieved by the decision process S221 from the base 100m of recorded images in a similar manner to step S2210 of FIG. 7. In addition, the visual descriptors DEk (k=1 to K) calculated at step S107, are retrieved from the base 100d.

Step S2311 receives the data DIMk as well as the descriptors DEWt of the published image coming from the base 100wd. The use of points of interest in the image makes it possible in particular to perform a robust match termed feature-based registration as described for example in the article entitled "*MLESAC: A new robust estimator with application to estimating image geometry*" by P. Torr and A. Zisserman, CVIU, vol. 78, pages 138 to 156, year 2000. With this method, and relying on each set of descriptors DEk and on the descriptors DEWt, the published image IPt is readjusted to make a new image IPt'k.

At step S2312, for each proprietary image ICk (k=1 to K), a measurement is made of a match error ECk between the published image IPt'k and the proprietary image ICk.

In a similar manner to the operation described with reference to steps S2217 to S2220 of FIG. 7, steps S2317 to S2320 constitute similar steps. Thus, when a minimum value of the match errors Eck for the K proprietary images IC1 to ICK which are closest is less than a predetermined threshold ECs, then the published image IPt is considered as being the matching proprietary image ICk of the base 100 of proprietary images and an alarm AL is generated.

According to a second aspect of the invention, the decision makes provision for being capable of affirming with a certain level of confidence whether or not a published image matches with one of the recorded images, that is to say with a proprietary image. An "exact" match is sought here, that is to say that the client must be informed of a use of its image and not of another one even if very similar. Furthermore, the system must be able to decide whether it is the same image even if the image used has undergone modifications with respect to the recorded image. These modifications (such as reframing operations, changes of size or of brightness/contrast or even of colors, etc.) may have a non-negligible impact on the visual appearance of the image used, which does not facilitate the taking of a decision, even if it is a human decision. In certain cases, the same image in modified form may sometimes appear visually "more remote" than a different image representing the same scene.

Figure 10:
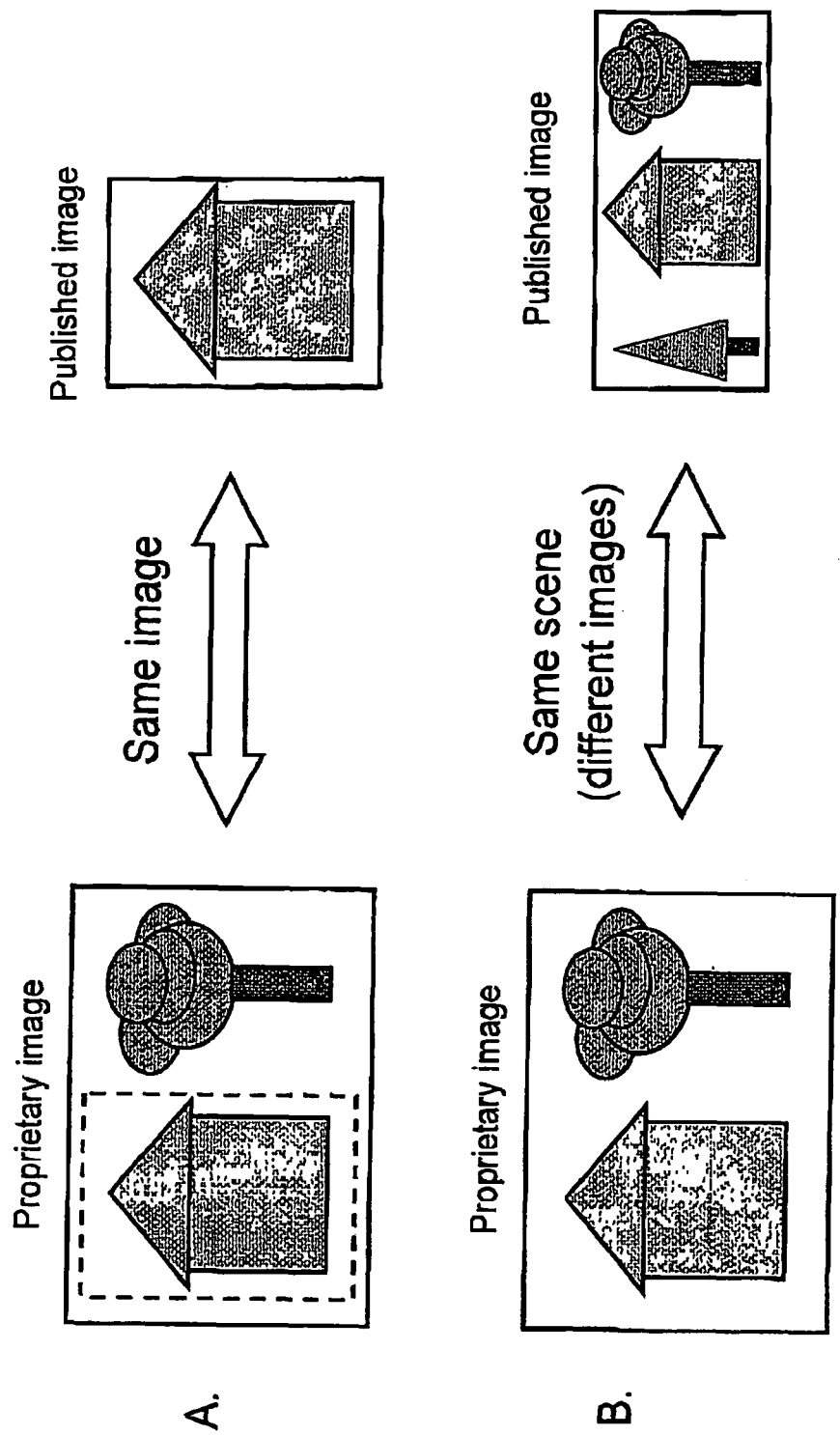
FIG. 10 illustrates the "same scene" type of match and the "same image" type of match.

By way of example, two possible match scenarios are shown in FIG. 10 which illustrate the ambiguity of the concept of "exact" match between images. According to a first scenario (scenario A), the proprietary image has been reframed. There is thus only a portion of common content between the two images but it is indeed the "same image".

According to a second scenario (scenario B), the published image is an image that is different from a proprietary image. There is then said to be the "same scene" which has been taken, for example, from a different point of view and different viewing angle. Nevertheless, the published image has a portion of content in common with a proprietary image and additional content may have been added by a post-editing operation.

A detailed description will now be given with reference to FIG. 11 of the selecting process P120 and deciding process P121 enabling it to be decided whether a published image, that is to say a first multimedia entity, denoted IP, matches one (or more) of the recorded proprietary images, that is to say second multimedia entities, denoted IC, of the database of proprietary images 100.

As described previously, a first stage of the process P120 consists of selecting the K candidate proprietary images from the proprietary image base, which are the closest to the published image by means of the description information of the images. To that end, a description of the published image is calculated at step S1. Concerning the set of proprietary images, the descriptions corresponding to these images are indexed in the base 100 of proprietary images.

The descriptions of the images are modeled by means of one or more local and/or global descriptors.

Thus, step S1 makes provision for calculating one or more descriptors d_IP characterizing the published image IP, thus one or more $N_{ip}$ descriptors d_IP may be calculated, and these may be of different types.

Step S1 is followed by the step S2 of searching for the K images IC, that is to say a plurality of second multimedia entities, of the set of proprietary images, that is to say of the set of the second multimedia entities, which are the closest to IP according to the descriptions of the images.

The K selected proprietary images ICk (k=1 to K) identified by their respective unique identifiers IDk (k=1 to K) are sorted using a measurement of similarity with the published image IP, as was seen earlier.

Step S2 terminates the selecting process and the following steps S3 to S11 concern the deciding process P121 according to the invention, Once the selecting process has terminated, a supplementary step S3 is carried out which is dependent on step S2 in the sense that it uses the same descriptions as the preceding selecting step.

The object of this step is to characterize, for each of the K candidate proprietary images ICk, a match with the published image in the form of a first criterion of match reliability denoted C1.

The mode of calculation and the nature of this criterion depend on the description technique used.

The mode of calculation may be carried out, for example, according to the following two techniques, each of them being associated with an independent selecting step.

A first technique is a technique of local description, in which the first criterion of match reliability C1 represents a Bayesian measurement defined as the ratio between the probability that the published image does not match the proprietary image considered over the probability of the opposite hypothesis, the probabilities being calculated as a function of the result of matching between the two images which will be set out later at the time of the description of FIGS. 13 and 14.

A second technique is a technique referred to as "local/global", in which the first criterion of match reliability C1 represents a probability of false alarm, that is to say the probability that the published image does not match the proprietary image considered.

Following step S3 is the step S4 of calculating the first match criterion. This is a first decision step consisting of determining a possible match between the published image and a proprietary image.

For this, the calculated value of criterion C1 is compared to a predetermined threshold Δ, the threshold of course depending on the technique employed.

If the first match criterion is greater than the threshold, the algorithm is terminated by step S11, since the first criterion of similarity between the two images has not been identified.

In the opposite case, that is to say when the first match criterion is less than the threshold, this means that a first criterion of similarity between the two images has been identified and that the published image may match the proprietary image considered. Thus, this step is a step of first match decision.

Step S4 makes it possible to establish that the published image and the proprietary image are so strongly similar from the point of view of their content that it can be concluded that the published image and the proprietary image represent at least the same scene with a measurement of confidence approximately equal to C1.

An alarm may be emitted destined for the user or the owner of the proprietary image, in order to indicate to him that the published image represents the same scene as the proprietary image identified, to a certain degree of confidence.

At this step of the process, the same scene may also mean the same image (by definition, the same image defines the same scene). It may be necessary to test whether the level of match between the images may be increased. The algorithm then continues with steps S5 to S10, in order to establish whether the level of match of "same image" type is reached according to a predefined criterion.

For this, the algorithm relies on information contained in the published image. A possible technique makes provision for using watermarking information.

Thus the match decision taken at step S7 is performed after extraction of a watermark contained in the published image, taking into account information stored in the base of proprietary images for the proprietary image concerned.

In the case of a watermark that is characterized, for example, by a secret key and a message, it is decided that the watermark is the same if the message extracted using the key matches the recorded message.

These operations presuppose that the proprietary images recorded were watermarked beforehand. For this, during the process of watermarking a proprietary image IC, the process generates the following watermarking information: a secret key CS, a pseudo-random sequence SPA, a message ME, and the type ALGO of the watermarking algorithm used, as was seen earlier at step S103 to S105 of FIG. 2.

When extraction of a watermark using a non-blind technique is used, the watermarking process also comprises the generation of an insertion parameter PI used for watermarking the message in the proprietary image, and an extraction parameter PE used on extraction of the message in the proprietary image, as seen at step S103.

The information CS, ME, SPA and ALGO which was used to watermark the proprietary image is stored in the base of proprietary images 100. This information is then used during the image verifying process, at step S7. The storage of the pseudo-random sequence SPA is not mandatory if the pseudo-random sequence SPA depends solely on the secret key CS or on the secret key CS and the size of the initial image. In the latter case, the size of the initial image will also be stored with the information relating to the CS.

On using a non-blind watermarking technique, the parameters PI and PE of insertion and extraction associated with an image are also stored in the database and used during the verifying process.

The insertion of a watermark MA in the proprietary image IC is performed after the watermark MA has been generated as a function of the pseudo-random sequence SPA. The watermark MA may also depend on the message ME.

On extraction of the watermark, it may be necessary to perform a readjustment of the published image IP.

Thus, step S5 consecutive to step S4 of first match decision, performs a geometric readjustment of the published image IP and delivers a readjusted published image IP. For example, if the published image IP has undergone a change of scale, the published image IP can be re-dimensioned to its original size. If, in addition, the image IP has been reframed, then the geometric readjustment consists of re-synchronizing the published image IP with the proprietary image ICk.

It will however be noted that the readjustment performed at step S5 is not always necessary and depends on the watermarking algorithm used.

Step S5 is followed by the step S6 of detecting the watermark in the published image.

Figure 11:
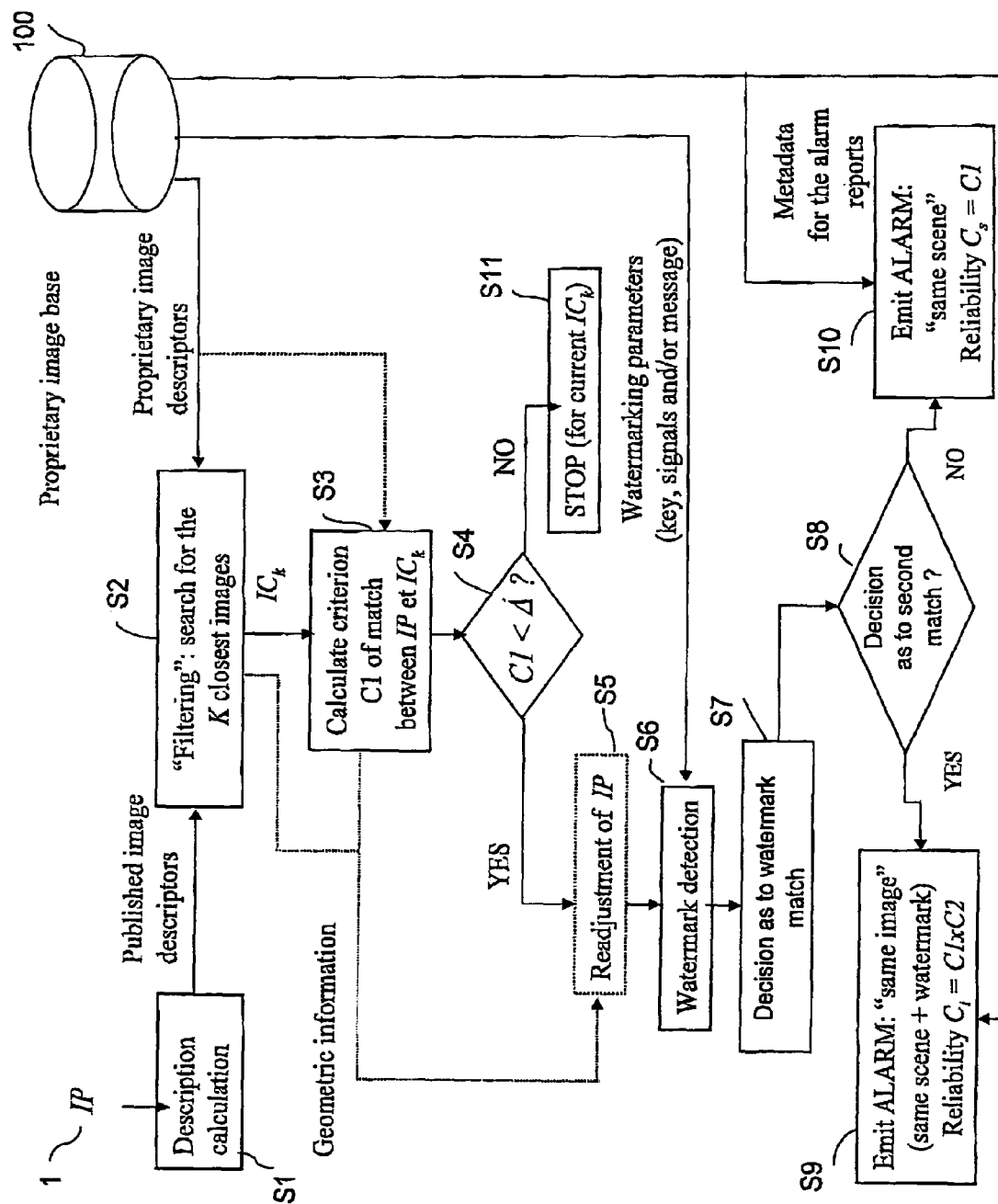
FIG. 11 is a functional flow diagram of a method according to a second aspect of the invention of verifying at least one match between an image and at least a second image implemented in the device for verifying digital images of FIG. 1.

As represented in FIG. 11, step S6 is provided in order to retrieve the item of information ALGOk from the base of proprietary images, which is relative to the type of watermarking algorithm used, and the extraction parameters PEk generated during the insertion process of the watermark. The item of information ALGOk is provided such that the process can decide whether or not a geometric readjustment should be made. The extraction parameters PEk are used to perform non-blind extraction of the message contained in an image.

In the base of proprietary images, provision is made to retrieve also other metadata MDk, the secret key CSk used in the watermarking algorithm and the message MEk inserted in the proprietary image ICk.

Step S6 ensures the extraction of a message $ME_{IP}$ contained in the published image IP using the information CSk and ALGOk. A non-blind extraction can also be performed using the parameters PEk that are specific to the image, indexed by k. A non-blind extraction gives better performance than the blind watermark extraction methods.

At the issue of step S6, a decision is taken as to the match between the watermarking messages of the published image and the proprietary image concerned.

The match decision taken at step S7 is performed after extraction of a watermark contained in the published image, and with respect to the information stored in the proprietary base for the corresponding image.

The reliability of the detection of the match of the watermarks (step S7), denoted C2, is expressed in terms of probability of false alarm. According to one embodiment, for a message constituted by B binary elements of useful information, C2 is equal to $2^{-B}$.

Step S7 is followed by the step S8, consisting of deciding as to a second match between the published image and a proprietary image according to the result of the decision of first match between the published image and the proprietary image concerned and the decision of match between the watermarking messages of the two images.

If the decision of match between the watermarks is positive, it is considered that the published image matches the proprietary image considered, and the decision of second match of step S8 is of "same image" type.

In the opposite case, that is to say if the watermark detection fails, that is to say that the decision of match between the watermarks is negative, since it is not the same image or the watermark has been erased, then at step S8 of second match decision, consideration is merely made of a match of "same scene" type.

A reliability measurement of second match between the published image and the proprietary image considered is associated with the second match decision (step S8).

Thus, if the second match decision is a match of "same scene" type, the reliability measurement C of that decision takes the value of the first criterion C1 of match reliability between the published image and the proprietary image considered (step S10).

In the opposite case, that is to say if the second match decision is a match of "same image type" (step S9), the reliability measurement C of the decision is relative to the watermarking match decision and to the preceding decision of "same scene" type (within the meaning of the criterion C1 used). Due to this, it is possible to express the overall reliability as a function of both the reliability values.

In the case of the local/global technique, since the two criteria express probabilities of false alarm of independent events, it is possible to express C=C1×C2 by the product of the two criteria.

It may be noted here that the smaller C, C1 or C2, the higher the associated level of confidence.

In the same manner, in the case of the local technique, for which the criterion C1 is a Bayesian criterion expressed as a ratio of probability between the two hypotheses of non-match and match, the overall criterion C can be expressed as the product C=C1×C2 by assuming that the probability of detecting the watermark, under the hypothesis that the image is the same as the watermarked image, is equal to 1.

In either case, the decision is followed by the issuing of an alarm report.

Figure 12:
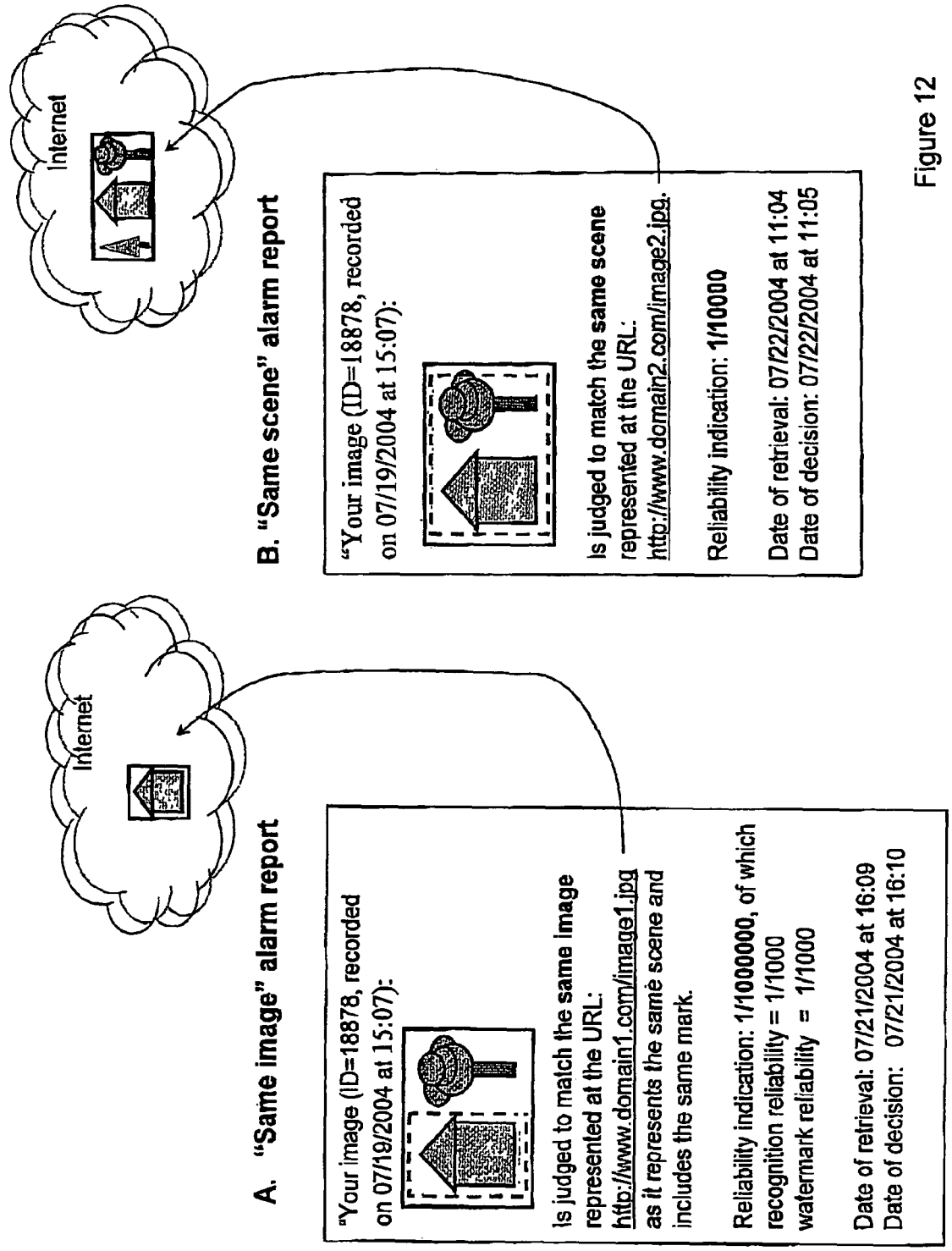
FIG. 12 is an example of a report generated at the issue of the method of verifying image matches according to the second aspect of the invention.

With reference to FIG. 12, alarm reports are shown. These reports comprise the items of information which are as described with reference to FIG. 4.

Supplementary information linked to the result of the second match decision are also added. Thus, the decision information of "same image" or "same scene" type is inserted in the report, as well as the value of the reliability measurement relating to the decision, respectively C=C1×C2 or C=C1, accompanied by the meaning of that measurement for information purposes.

Figure 13:
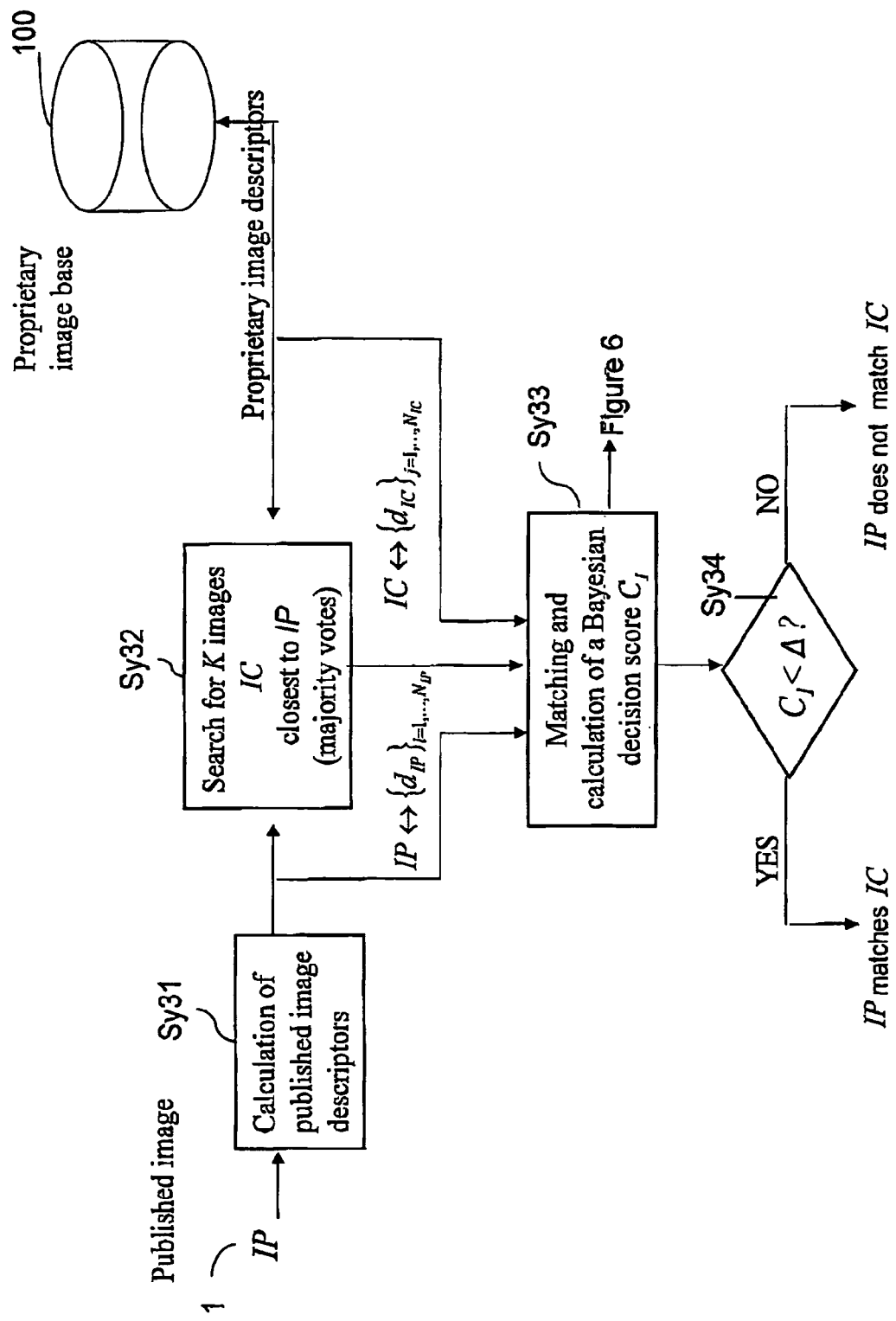
FIG. 13 is a functional flow diagram representing a first embodiment of a verifying method of FIG. 11 implemented in the device for verifying digital images of FIG. 1.

With reference to FIG. 13, a description is now given of a first embodiment of steps S1 to S4 of the algorithm of FIG. 11, using a local description technique.

As input to the algorithm, there is, on the one hand, a published image IP (first multimedia entity) and, on the other hand, the database of proprietary images 100 (set of second multimedia entities). It is assumed in this embodiment that the items of description information, termed descriptors, of the proprietary images are calculated beforehand and stored in the base of proprietary images or in association with it.

The implementation of step S1 of FIG. 11 (calculation of a description of the published image) makes provision, according to this embodiment, for determining descriptors, for example known as "local" descriptors (Step Sy31 of FIG. 13).

A local descriptor d associated with a unit of interest of the image, such as a point of interest of the image, is, for example, constituted by two indissociable items of information:

an item of position information p of the point of interest, with, for example, p=x+i·y in complex number notation, where x and y are the Cartesian coordinates of the point of interest in the coordinate system of the image, and an item of information of local content around the point of interest, which information is organized in the form of a vector v and is associated with the item of position information p.

Thus a published image IP is described according to $N_{IP}$ local descriptors which will be denoted $\{d\_IP_i\}_{i=1\ldots Nip}=\{p_i, v_i\}_{i=1\ldots Nip}$.

The same applies for the description of the proprietary images. A proprietary image IC is described according to $N_{IC}$ local descriptors which will be denoted $\{d\_IC_i\}_{i=1\ldots Nic}=\{p_i, v_i\}_{i=1\ldots Nic}$.

These descriptors thus determined are then used during the following steps, without requiring new calculation of descriptors.

The following step Sy32 of FIG. 13, corresponding to step S2 of FIG. 11, is a selecting process which employs search techniques based on the content of the images in order to select the K proprietary images $IC_1$ to $IC_K$ closest to a published image IP in course of processing. The closeness of the two images IP and IC must here be understood in terms of the visual similarity between them.

Step Sy32 consists of performing a search, in the base of the proprietary images 100, for the descriptors which are the closest to the descriptors of the published image. The descriptors d_IC of second images which are the closest to the descriptors d_IP, are extracted from the set of the descriptors of the set of second images stored in the base 100 of the proprietary images. The extracted descriptors d_IC are those matching the selected proprietary images $IC_k$ (k=1 to K).

For this, for example, a matching of each of the vectors containing the information on local content of the published image with the vectors of the images of the proprietary base is carried out.

The number of vectors matched between two images is termed the "score".

The selected proprietary images are next sorted by means of a majority vote algorithm. Thus, the proprietary images are classified according to the number of their vectors matched with the vectors of the published image.

The K closest images correspond to the K highest scores.

The following step Sy33 of FIG. 13, corresponding to step S3 of FIG. 11, consists of matching descriptors of the published image with descriptors of images of the base of the proprietary images, and then of calculating for each proprietary image its criterion of match with the published image.

The matching of descriptors of the published image with the descriptors of the base of the proprietary images is performed by means of calculations of distance between the vectors of descriptors $v_{IP}$ and $v_{ic}$, using, for example, a Euclidian distance or a Mahalanobis distance.

For this, step Sy33 makes provision for matching the set of descriptors {d_IP} of the published image with each of the descriptors {d_IC} of the images $IC_k$ selected at step Sy32.

The matching in step Sy33 is performed on the descriptors calculated at step Sy31, without requiring an additional characterization and thus the calculation of new descriptors.

This matching is a matching of the descriptors of a published image with the descriptors of an image of the base of the proprietary images. It is thus independent of the other images of the base of the proprietary images.

This matching is followed by the calculation of a criterion, denoted C1, which represents a first reliability criterion of the match made.

More particularly, the value of C1 corresponds to the estimation of a Bayesian decision criterion. This decision criterion is defined as the ratio between:

on the one hand, the probability that the first image does not match one of the second images given the result of the matching steps, that is to say the probability that the images "do not match each other" (hypothesis H1) given that matching has been carried out, and on the other hand, the probability that the first image does match one of the second images given the result of the matching steps, that is to say the probability that the images "match each other" (hypothesis H0) given that matching has been carried out.

Thus, the value C1 is determined by the ratio between the percentages of chance between the two hypotheses.

The match between images includes the case in which the published image is, in whole or in part, the same image as the recorded proprietary image, and that in which it represents the same scene as a recorded proprietary image.

Figure 14:
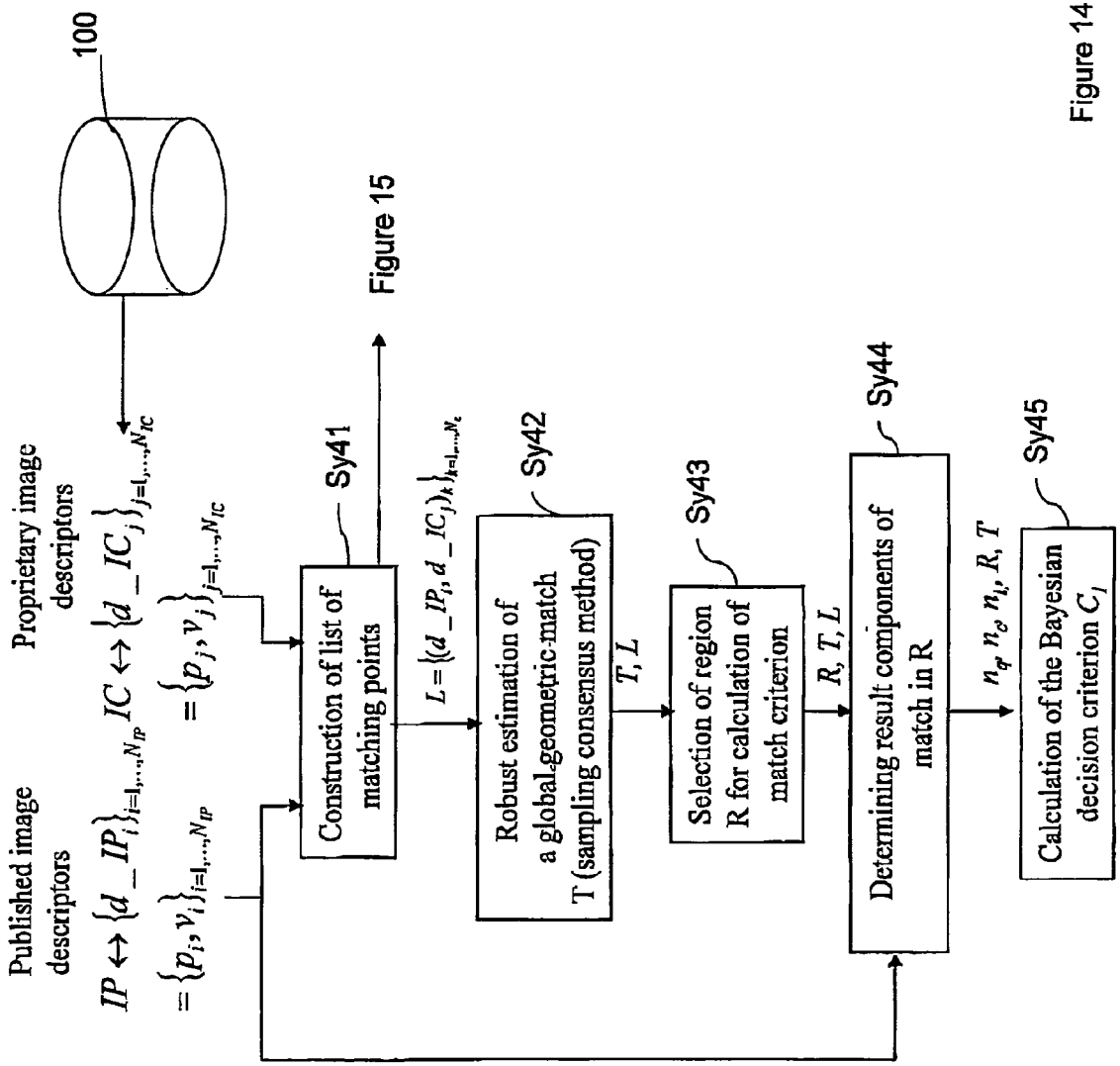
FIG. 14 is a functional flow diagram of the method of matching a published image with a proprietary image.

An implementation of step Sy33 according to the invention is represented in FIG. 14. That Figure illustrates the set of the steps of matching descriptors $\{d\_IP\}_{i=1, \ldots, N_{ip}} = \{p_i, v_i\}_{i=1, \ldots, N_{ip}}$ of the published image IP with the descriptors $\{d\_IC\}_{j=1, \ldots, N_{ic}} = \{p_j, v_j\}_{j=1, \ldots, N_{ic}}$ of a selected proprietary image IC and the calculation of the criterion C1, these steps having to be applied to the set of the K selected proprietary images.

With reference to FIG. 14, the matching process commences with a step Sy41 of construction of a list of the points which match.

Thus, the first step Sy41 makes provision for establishing a list $L = \{(d\_IP, d\_IC)\}_{k=1, \ldots N_{IC}}$ of matches of the descriptors of the published image d_IP with the descriptors of a proprietary image d_IC, of which an embodiment is described below.

Step Sy41 matches items of information on local content, $v_{IP}$, within the descriptors of a published image and the items of information on local content, $v_{IC}$, within descriptors of a recorded proprietary image.

Figure 15:
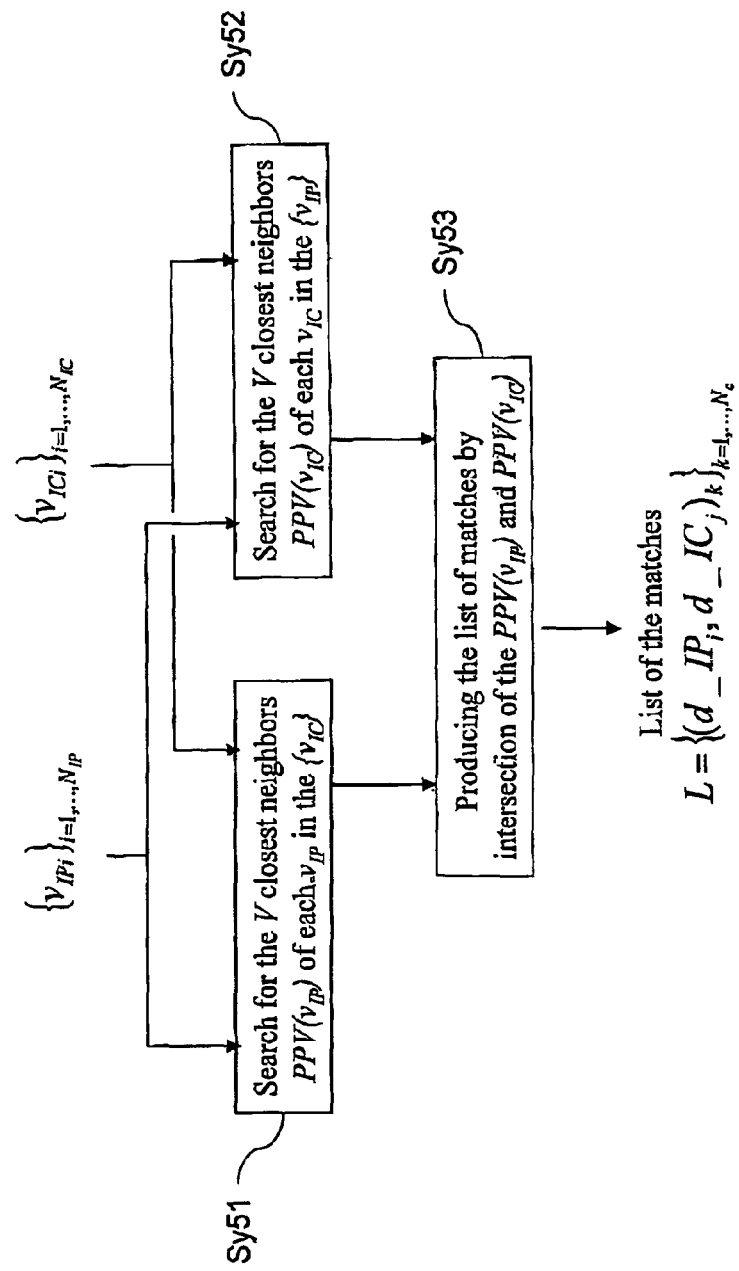
FIG. 15 is a functional flow diagram of the method of matching information on local content of two images.

The detail of this step of establishing a list of matches is provided by the description which follows, made with reference to FIG. 15 which illustrates an algorithm completing that of FIG. 14. However, other embodiments may be envisaged.

The algorithm of FIG. 15 comprises a first step Sy51 which consists, for each vector containing the item of information on local content of the published image $v_{IP}$, of searching for the set PPV($v_{IP}$) of the matches of the vector $v_{IP}$ with its V closest neighbors among the vectors $v_{IC}$ containing the item of information on local content of the proprietary image.

This search may be carried out, for example, by determining, for each item of information on local content of the published image IP identified by a vector $v_{IP}$, the set of the distances between $v_{IP}$ and each item of information on local content of the proprietary image IC identified by a vector $v_{IC}$.

The items matched in the list of the closest neighbors PPV($v_{IP}$) are the items of information on local content of the proprietary image $v_{IC}$ matched with the item of information on local content of the published image $v_{IP}$ of which the distances determined are the least. A specific number V of matched items is thus selected.

A Euclidean distance or a Mahalanobis distance between the items of information on local content is, for example, used.

Furthermore, a constraint may also be added on the maximum value of the Mahalanobis distance such that only the vectors having a Mahalanobis distance less than a threshold value $D_m$, are able to be matched.

In this case, with each item of content information $v_{IP}$ of a published image, there is associated at most a number V of matching items.

According to a particular case, the number V of matching items is chosen equal to 1.

At step Sy52, performed independently but in similar manner to step Sy51, for each item of information $v_{IC}$ on local content of a proprietary image, the set PPV($v_{IC}$) is searched for of the matches between $v_{IC}$ and its V closest neighbors among the vectors $v_{IP}$ of the published image.

Finally, at step Sy53 consecutive to the two steps Sy51 and Sy52, the intersection is made between the two sets of matches PPV($v_{IP}$) and PPV($v_{IC}$) defined respectively at steps Sy51 and Sy52. Thus, only the matches present in both sets are considered and listed in the resulting list L of matches.

At the issue of step Sy53 of FIG. 15, there is thus a list $L = \{(d\_IP, d\_IC)\}_{k=1, \ldots N_c}$ of $N_c$ matched items. This list comprises a set of $N_c$ pairs, each having a descriptor of the published image IP as first item, and as second item, a descriptor of the proprietary image IC.

The algorithm for constructing the list of matching points is next terminated, the list having being made by matching the information on local content of FIG. 15.

Returning to FIG. 14, step Sy41 of constructing the list of matching points is followed by a step Sy42 of estimating a global geometric match, the object of which is to perform a geometric match of the points of interest of the images.

More particularly, step Sy42 makes provision for measuring the geometric coherency of the matching points of the list L obtained at step Sy41.

To do this, it is assumed that there exists a geometric transformation T linking the positions of the matches between descriptors of a proprietary image and a published image of the list L.

It is to be noted that step Sy42 aims to estimate this transformation.

The choice of the type of transformation T to consider must be dictated by the type of geometric transformations that the proprietary image may have undergone to lead to the published image.

This choice must also be consistent with the robustness of the detector of points of interest and of the information on local content v with respect to geometric transformations.

This is because the transformation is estimated on the basis of matches established beforehand according to the local content description vectors v.

For example, the group of transformations T of plane similarity type is considered in particular. This is because most of the transformations performed on a digital image belong to this group.

This group includes, for example, translations arising principally from a reframing operation, changes of scale, and rotations.

The local descriptors described in the article entitled "Utilisation de la couleur pour l'appariement et l'indexation d'images" (which title may be translated by "Use of color for matching and Indexing images") from the INRIA Search Report No. 3269, September 1997, by P. Gros et al., are robust to this type of transformation.

Mathematically, a plane similarity T transforms a position $p_{IC}$ in the proprietary image IC into a position $p_{IP}$ in the published image IP according to the following relationship, in complex number notation:

$$p_{IP} = T(p_{IC}) = s(p_{IC} e^{j\theta} + t)$$

where:

s is a real value representing the factor of scale change,

θ is a real value representing the angle of rotation (in radian), and $t = t_x + it_y$, is a complex value representing the translation ($t_x$, $t_y$) in artesian coordinates.

In order to perform the estimation of the transformation with four parameters (s, θ, $t_x$, $t_y$), this transformation must be studied for at least two pairs of separate matches of the list L.

It should also be noted that, numerically, the plane similarity model also makes it possible to take into account slight variations in viewing angle, modeled theoretically by homographic or even affine transformations.

It should be noted that the list L may comprise numerous "false" matches with respect to the geometric model, that is to say matches identified which are not true matches. This is because these matches are solely made on the basis of information on local content, and so matches may be identified without there being a match between the associated position information It is thus preferable to use a robust estimation method which enables the influence of false matches (known as "outliers") to be eliminated.

Among the known estimation techniques, it is for example possible to use the so-called "sampling consensus" methods. This is because they are particularly well-adapted to this type of estimation since they make it possible to separate out false matches.

These so-called "sampling consensus" methods principally operate according to the following schema:

In a first step, a sub-set of matches is chosen that are necessary for the calculation of the geometric transformation T, and then the transformation T is determined.

The sub-set comprises, for example, two matches for similarity.

In a second step, the transformation determined at the first step is applied to the other matches, and then the matches ($p_{IP}$, $p_{IC}$) which satisfy the transformation determined are enumerated.

This verification is performed using a criterion of distance between the transformed position and the actual position, i.e. $|p_{IP} - T(p_{IC})| \leqq \epsilon$, where |–| designates the modulus (Euclidian distance) and ε is a threshold fixed in advance. These true matches are designated "inliers" to contrast with "outliers".

The first and second steps described earlier are reiterated for other possible sub-sets.

Finally, the transformation T determined at the first step and for which the number of true matches obtained at the second step is maximum, is selected.

Concerning the choice of the subsets necessary for calculating the transformation T (first step), the known methods of estimating by sampling consensus operate, for example, by successive random picking.

These methods of estimating by sampling consensus are also termed RANSAC ("RANdom SAmple Consensus"). For more information concerning these methods, the reader may refer in particular to the article entitled "Random sample consensus: A paradigm for model fitting with applications to image analysis and automated cartography" by M. A. Fishler and R. C. Bolles, Communication ACM, Vol 24, No 6, pp 381-395, 1981.

This random choice is often used due to the fact that it is often complex to consider all the possible combinations of choice if the number $N_c$ of items of the list L at the outset is high.

This is because, in the case of the calculation of a plane similarity for which, for example, two items of the list are necessary, there are $$\frac{N_c(N_c - 1)}{2}$$

possible choices.

Nevertheless, step Sy41 preceding that estimation makes it possible to minimize the value of $N_c$. This number of items is furthermore made less when an additional constraint of maximum distance is applied to the distance between the vectors v. As the set of the possible choices is limited, it is possible to consider them all and thus the probability of a good estimation of the transformation T is maximized.

In the case in which several identical values are obtained of the maximum number of true matches for different estimations of the transformation T, selection is made, for example, of the transformation T which minimizes the quantity constituted by the sum of the squares of the distances $|p_{IP}-T(p_{IC})|$ of the items that truly match.

Step Sy42 of robust estimation of a global geometric match T is then followed by step Sy43 of selecting a region.

At step Sy43, on the basis of the list L and the robust transformation T estimated at the preceding step, a spatial region R of the images is defined where each of the images appears to match.

Thus, a definition of the region R will be made in order to measure in that region the coherency of the matches between the two images. This coherency takes into account two possible scenarios.

Region R is, for example, defined as a rectangular region selected in the proprietary image.

This is because a rectangular definition of the region R corresponds to a mode of selection commonly used by image editing software.

This choice is not however limiting and the match region R selected may be of non-rectangular form.

It is to be noted that the region R may also be the image itself.

Furthermore, the region R to be considered must be the region having the highest chance of actually being a matching region. For this, the results of the robust estimation are used. The region R is defined as the region of which the perimeter is defined by the units of interest which truly match, that is to say which are matched at the step of geometric matching.

The deciding step will then be carried out on the basis of that selected region which may be a smaller region of the image. Indeed, this makes it possible to take into account the fact that the images may match only in part.

Step Sy43 is followed by step Sy44 during the course of which the result of the matching steps are determined, in a manner that is limited to the selected matching region. This result, in addition to the region R and the transformation T, will later be used for calculating the decision criterion.

The following three components of the result are considered in particular:

the first component of the result considered is the number $n_q$ of units of interest $p_q$ of the published image IP which project into the region R of the proprietary image, that is to say satisfying the mathematical expression $T^{-1}(p_q) \in R$;

the second component of the result considered is the number $n_c$ of units, among the $n_q$ preceding units of interest, for which the items of information v on local content of the local description match with units of interest of the proprietary image; thus, identification is made of the number of units of interest belonging to the list L produced at the time of the matching of the items of information on local content which belong to the region R defined;

the third component of the result considered is the number $n_i$ of truly matching units of interest among the $n_c$ units of interest determined previously; these units of interest are determined as a function of the robust transformation estimated at step Sy42, that is to say as a function of their geometric matching.

Figure 16:
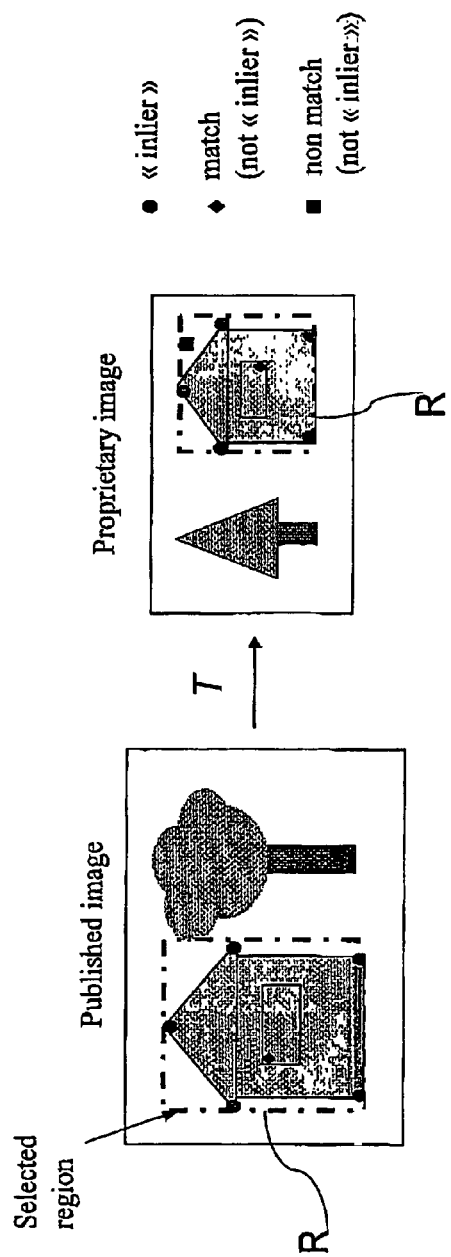
FIG. 16 is a diagrammatic presentation of the matching resulting from the invention.

A example of a result of observations is illustrated in FIG. 16.

Thus, according to FIG. 16, the region R selected in the published image comprises the set of the units of interest resulting from the geometric matching.

The first component of the result, $n_q$, enumerating the number of units of interest present in the region R, has the value 7.

The second component of the result $n_c$, enumerating the items of information on local content matching units of interest of the proprietary image, has the value 6. This is because, among the 7 units of interest of the region, only 6 units of interest have been matched during the step of matching the items of information on local content.

The third component of the result $n_i$, enumerating the units of interest matched during the step of geometric matching, has the value 5. This is because, among the 6 units of interest matched at the step of matching the items of information on local content, only 5 units of interest were then matched during the step of geometric matching.

Returning, step Sy44 is followed, by step Sy45 of calculating the first criterion (C1) of match reliability.

For example, this step makes provision for determining the first criterion of match reliability, according to a criterion of a Bayesian decision between two opposite hypotheses.

The first hypothesis $H_0$ is that the published image matches the proprietary image.

The second hypothesis $H_1$ is that the published image does not match the proprietary image.

Mathematically, the value of the first criterion of match reliability is defined in the following manner:

$$C1 = \frac{P(H_1 | obs)}{P(H_0 | obs)} = \frac{P(obs | H_1)}{P(obs | H_0)} \times \frac{P(H_1)}{P(H_0)}$$

This is the ratio between the probability of not having a match and the probability of having a match, these two conditional probabilities being dependent on the result of the matching steps, denoted obs, and which result from the method according to the invention as described in the preceding steps.

The criterion is estimated using the right-hand expression of the formula set out above: this is the Bayesian approach according to which the probabilities of the observations are manipulated conditionally on the hypotheses.

Thus the expression involves the ratio of two prior probabilities, denoted $P=P(H_1)/P(H_0)$. This ratio measures the ratio between the prima facie chances of having one of the hypothesis and of having the other of the hypothesis.

This ratio may vary depending on the context and depend upon an assumption about the published image in question.

In particular, the value of the ratio is lower when the origin of the published image, for example the Web site of a photo agency, is linked to the origin of the proprietary image which is, for example, the photographer working for said photo agency.

It is thus possible to render the decision adaptive according to the context by varying the value of P.

Thus, given the results of the matching steps which comprise, in addition to the transformation T and the region R obtained, the values of $n_q$, $n_c$ and $n_i$ obtained at step Sy44, C1 is calculated in the following manner:

$$C1=10^{C'1} \times P$$

$$C'1=C1_{n_c,n_q}+C1_{n_q,n_c}$$

with:

$$C1_{n_c,n_q} = n_c \times Q_1 + (n_q - n_c) \times Q_2 \text{ and}$$

$$C1_{n_i,n_c} = (n_i - 2) \times \text{Log}_{10} \frac{pi_{H1}}{pi_{H0}} + (n_c - n_i) \times \text{Log}_{10}\left(\frac{1 - pi_{H1}}{1 - pi_{H0}}\right)$$

with $$pi_{H1} = \frac{A(\varepsilon)}{A(R)} \text{ and}$$

$$pi_{H0} = Q_3 + Q_4 \times \frac{A(\varepsilon)}{A(R)}$$

where:
- $Q_1$, $Q_2$ are constants depending on the performance of the points of interest detector used, on the nature of the local description vector and on the thresholding on the Mahalanobis distance used at step Sy41. For example, using the detector of points of interest described in the document FR 0301545, and using a local description vector with 23 dimensions described in the document entitled "Utilisation de la couleur pour l'appariement et l'indexation d'images" (which title may be translated by "Use of color for matching and indexing images") from the INRIA Search Report No. 3269, September 1997, by P. Gros et al., and for a threshold value $D_m$ equal to 50, the choice is made of the values $Q_1 = -0.253$ and $Q_2 = 0.397$;
- $Q_3$, $Q_4$ are constants depending on the performance of the points of interest detector used. For the same detector as previously, the values $Q_3 = 0.6$ and $Q_4 = 0.4$ can be chosen;
- $A(\varepsilon)$ is a constant as a function of the value of the threshold $\varepsilon$ in distance used for determining the geometric matches. The value of $A(\varepsilon)$ represents the area of a disc of radius $\varepsilon$. For a value of $\varepsilon$ chosen equal to 1.5 pixel, $A(\varepsilon)$ is equal to an area equivalent to 9 pixels.

A(R) represents the area (in the same units as the value of $A(\varepsilon)$, i.e. in number of pixels) of the selected matching region R measured (projected) in the published image.

Step Sy45 thus terminates the algorithm of FIG. 14 and step Sy33 of FIG. 13 which is followed by step Sy34, corresponding to step S4 of FIG. 11. During step Sy34, comparison is made between the value of the first criterion C1 of match reliability obtained at step Sy33 and a predetermined threshold value, denoted Δ, for the purpose of deciding as to a first match between the first image, i.e. the published image, and a second image, i.e. a proprietary image, depending on the result of the comparison.

The value of C1 depends on the context P defined as the ratio of the prior probabilities that the published image does not match a recorded proprietary image to the probability that the published image matches the proprietary image.

Thus, it is possible to adapt the criterion as a function of that ratio of probabilities.

For a given value P and a value of C1 calculated as a function of P, the result of step Sy34 makes it possible to decide whether the proprietary image IC matches the published image IP or not according to a first match.

The value of the threshold Δ makes it possible to set the reliability level of the first match.

For example, if the value C1 is less than Δ the proprietary image IC is judged to match the published image IP and the value of the reliability of this decision is at least Δ.

Thus, if the threshold takes Δ as its value, the reliability of the first match decision can be expressed by the following ratio: there is $$\frac{1}{\Delta}$$

times more chance of not being mistaken in the decision of match between the proprietary image and the published image than the chance of being mistaken.

In practice, it is possible to choose a set value of P equal to $P=10^4$ for the calculation of C1 and a threshold value Δ equal to $\Delta=10^{-4}$.

From the result of the comparison of step Sy34, the first match between the published image and the proprietary image considered is decided.

Step Sy34 of FIG. 13 is followed by steps S5 to S10 of FIG. 11 in order to detect a match of "same image" type.

According to this embodiment, the alarm report generated at the issue of the detection of a match between the published image and a proprietary image considered, may contain a description of the region of matching between the two images.

A second embodiment of steps S1 to S4 of FIG. 11 is described with reference to FIG. 17. This embodiment is based on a technique referred to as "local/global", according to which the first criterion of match reliability C1 represents a probability of false alarm, that is to say the probability that the published image does not match the proprietary image considered.

As input of the algorithm described with reference to FIG. 17 there is, on the one hand, a published image and on the other hand, the database of published images 100. It is assumed in this embodiment that the items of description information, termed descriptors, of the proprietary images are calculated beforehand and stored conjointly in the base of proprietary images.

Figure 17:
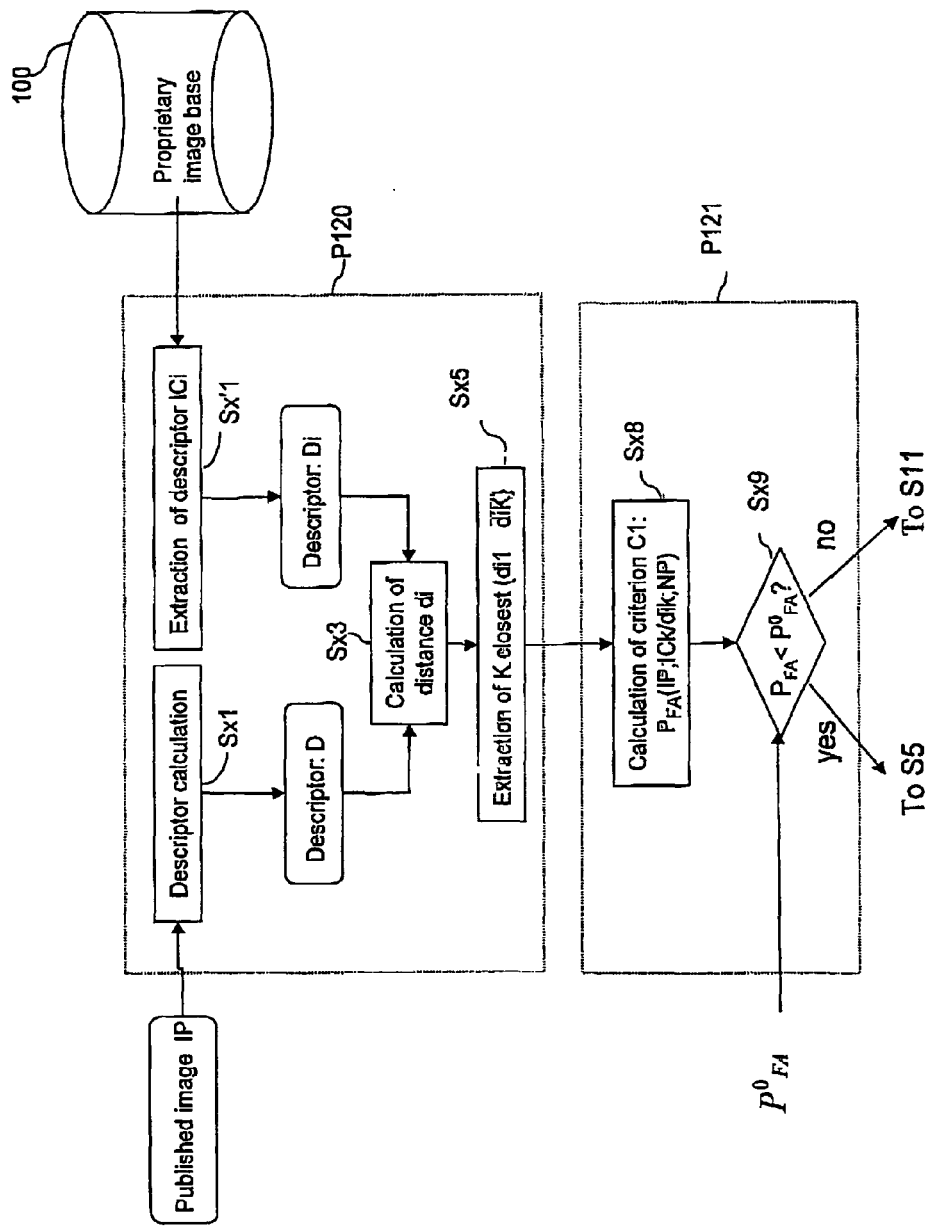
FIG. 17 is a functional flow diagram representing a second embodiment of a verifying method of FIG. 11 implemented in the device for verifying digital images of FIG. 1.

The selecting process P120 already cited with reference to FIG. 3 and represented in FIG. 17 comprises, on the one hand, a step Sx1 of calculating a descriptor D for the image IP, and, on the other hand, for each image ICi considered in the base of proprietary images, a step Sx'1 of extracting a descriptor Di.

Thus, step S1 of FIG. 11, of calculating a description of the published image, corresponds to step Sx1 of FIG. 17. This step consists of determining the descriptor of the published image IP.

The detail of this step is now described with reference to FIG. 18 which illustrates the set of main descriptor calculation sub-steps.

As input to the algorithm there is a digital image I. Each image is constituted by a series of digital samples, grouped into a bi-dimensional table, each sample representing a pixel of the image. For example, for an image with 256 levels of gray, each pixel is encoded over a byte, whereas for a color image, each pixel may be encoded over 3 bytes, each byte representing a component of chrominance, for example red, green and blue. For example, the representational space YUV will be used, where Y designates the luminance component and U, V, the chrominance components of the image. The luminance component Y of the image is extracted at the first step Sx11 of FIG. 18. Should the image I not be represented in YUV, a color space transformation is first of all applied to change it back to that representation.

Next, the luminance component of the image I, initially represented by a bi-dimensional table of size M×N, where M represents the number of lines and N the number of columns, is normalized at the following step Sx12, that is to say resampled to a predetermined size n×n, with, for example, n=256 pixels. The re-sampling is performed by a conventional interpolation method, such as bi-linear interpolation.

The normalized luminance is next divided (step Sx13) into a predetermined number X of blocks of equal size. In the embodiment described here, the image is divided into 100 blocks of size 25×25.

In each block, two points of interest are selected at the following step Sx14.

For example, the points of interest are the extrema of a filtering operator, in particular a Laplacian-of-Gauss operator. In order to have a sufficient number of points to describe an image, while maintaining a compact descriptor, two points of interest are selected for each block, one, said to be of first type, corresponding to the minimum value of the filtered signal, and the second, said to be of second type, corresponding to the maximum value of the filtered signal.

Figure 18:
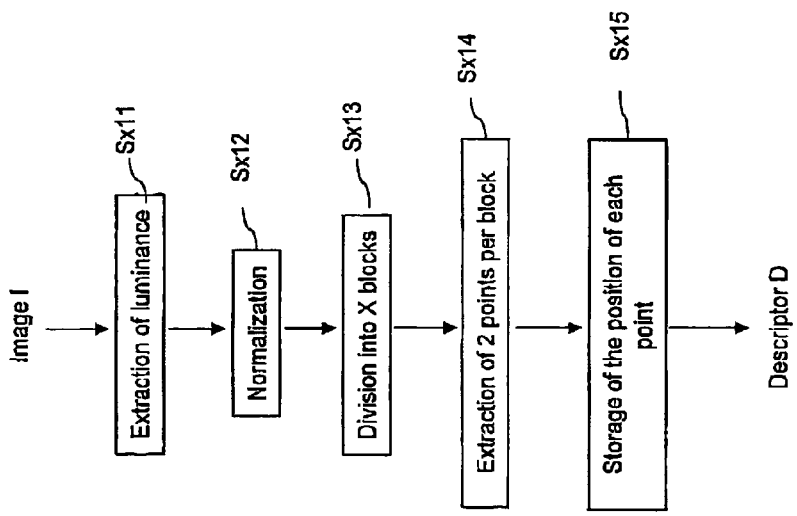
FIG. 18 illustrates a method of descriptor calculation according to the second embodiment of the verifying method of FIG. 17.

When the last block has been processed, in the last step Sx15 of FIG. 18, the coordinates of the points of interest obtained are stored in memory. For example, the coordinates of the points of the $i^{th}$ block will be noted: $(x_i^m, y_i^m)$ for a point of first type, $P_{min}$ and $(x_i^M, y_i^M)$ for a reply point of second type, $P_{max}$.

The set of the coordinates of the points of interest for the set of the blocks coming from the division forms a descriptor D according to this embodiment of the invention. In what follows the descriptor so obtained will be referred to as "local/global" descriptor. Thus, the descriptor is based on points of interest of the image, which are local features. These points of interest are, nevertheless regularly distributed in a global and systematic manner over all the blocks of the image, whereas in the purely local methods of the state of the art, the points of interest do not have a predefined spatial distribution in the image, but are solely placed on the points of high contrast.

It should be noted that it Is also possible to consider that the descriptor D of the image is formed from a plurality of descriptors relative to blocks of the image.

Returning to FIG. 17, steps Sx1 and Sx'1 are followed by step Sx3, during which the distance between the descriptor D of the image IP and each descriptor Di of the base is calculated. This distance calculation will be explained below with reference to FIG. 19.

At the following step Sx5, corresponding to step S2 of FIG. 11, extraction is made of the indices of the K images of the proprietary base that are the closest to the published image in terms of the calculated distance. These K images thus form a selection set which will later be used in the process of deciding as to a first match. The value of K is predetermined. According to a first example, a value of K equal to 4 is generally sufficient. According to a second example, the value of K may be equal to 10 if the number of images in the proprietary base is 30000. However, the value of K could be equal to the number of images in the base of proprietary images. Step Sx5 terminates the selecting process P120.

The process of deciding as to a first match follows the selecting process. For this, it comprises a first step of calculating a first criterion C1 of match reliability (step Sx8), as a function, on the one hand, of the distance between the image IP and an image ICk, and, on the other hand, of the total number of images contained in the base of the proprietary images, NP. This first criterion of match reliability makes it possible to measure probabilistically the probability of false alarm of a match decision between the image IP and ICk. The calculation of this first criterion (Eqx5a) will be detailed below with reference to FIG. 19.

Figure 19:
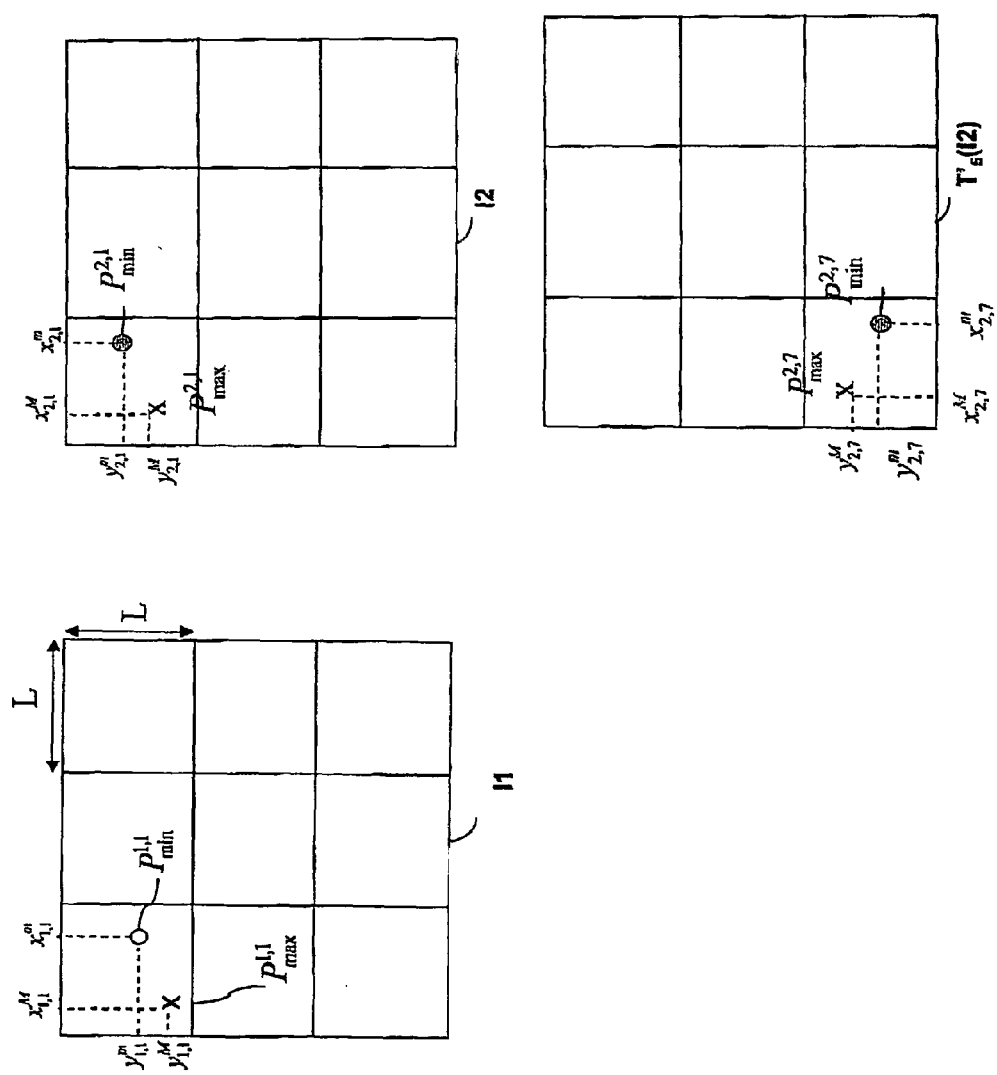
FIG. 19 is a diagram representing the distance associated with the descriptor obtained according to the invention.

FIG. 19 illustrates points of interest obtained and their respective coordinates, for two images to be compared, respectively denoted I1 and I2. As represented in that Figure, all the blocks coming from the division are squares of predetermined size L×L.

The points of interest are denoted $P_{min}^{k,i}$ and $P_{max}^{k,i}$ where k is the index of the image (1 or 2 in the example) and i is the index of the block.

The distance between the two images is calculated, for example, according to the formula:

$$d(I1, I2) = \sum_{i=1}^{X} \max(|x_{1,i}^m - x_{2,i}^m|, |y_{1,i}^m - y_{2,i}^m|) + \sum_{i=1}^{X} \max(|x_{1,i}^M - x_{2,i}^M|, |y_{1,i}^M - y_{2,i}^M|) \quad \text{(Eqx 2)}$$

Thus, the total distance is based on the sum of the distances obtained per block between the points of each type, the distance between two points of the same type being defined as the maximum of the difference between x-coordinates and y-coordinates of these points.

In practice, it is also desirable to take into account certain geometric distortions which modify the orientation of the image without modifying its content, such as multiple rotations through 90 degrees, and mirror operations with a horizontal axis and with a vertical axis. These distortions form a group of 8 geometric transformations T', which are described in the table of FIG. 20. This is a subgroup of the group: of plane similarities T, already described with reference to the first embodiment. In order to take into account these transformations, it suffices to simulate the result of such a transformation on the coordinates of points of interest of one of the images (for example the image I2) and to calculate a new distance. These geometric transformations modify both the order of the blocks and the position of the coordinates in the block. Finally, the distance selected is the minimum distance among the distances calculated for each of the simulated transformations T'.

For example, if a mirror operation with a horizontal axis is taken (denoted $T'_5$ in the table of FIG. 20), the coordinates (x,y) are transformed into (x, 256−y). The index of the block to which that point belongs is also modified according to the transformation. As illustrated in FIG. 19, in which the images are divided into 3×3 blocks, the points of interest of the block of index 1 become the points of interest of the block of index 7, when that transformation is applied.

The formula for calculating the distance (Eqx2) then becomes:

$$d(I1, I2) = \min_T \left( \sum_{i=1}^{X} \max(|x_{1,i}^m - T(x_{2,T(i)}^m)|, |y_{1,i}^m - T(y_{2,T(i)}^m)|) + \sum_{i=1}^{X} \max(|x_{1,i}^M - T(x_{2,T(i)}^M)|, |y_{1,i}^M - T(y_{2,T(i)}^M)|) \right) \quad \text{(Eqx 3)}$$

This mode of calculating the distance makes it possible to take into account certain common distortions, while being fast to implement.

The distance defined above by the equations (Eqx2) and (Eqx3) is next used for calculating the probability of false alarm which is used in the decision as to the first match (step Sx9 of FIG. 17).

We will now set out the mode of calculating the first criterion C1 of match reliability (step Sx8). This first criterion provides the probability of false alarm $P_{FA}$(I1,I2) associated with the decision as to similarity between the two images I1 and I2 as a function of the distance calculated previously.

Consider two images I1 and I2, a represented in FIG. 19. The position in terms of the x-coordinate or y-coordinate of a characteristic point on one of the blocks follows a uniform law of probability density 1/L. Due to this, the distance in terms of absolute value (x-coordinate or y-coordinate) between two characteristic points, of the same type of the same block of two different images, I1 and I2, follows a triangular law of density 2/L in 0 and of value 0 in L. Finally the density of probability in terms of the type $z=\max(|x_{1,i}-x_{2,i}|,|y_{1,i}-y_{2,i}|)$ is:

$$f_z(z) = \frac{4z}{L^2}\left(2 - \frac{3z}{L} + \frac{z^2}{L^2}\right) \quad \text{(Eqx 4)}$$

The distance defined by the equations (Eqx2) and (Eqx3) being a sum of terms of type z on each block, and, by admitting that the blocks are independent from each other, the sum of the terms of type z, after normalization by the mean and standard deviation, follows a normal distribution, i.e. a Gaussian law of null mean and of variance equal to 1.

Let m be the mean and a the standard deviation of the z law, the normalized distance d, i.e.

$$\tilde{d} = \frac{1}{\sqrt{X}}\left(\frac{d - Xm}{\sigma}\right)$$

follows a normal distribution. For example, in the case of the formula (Eqx 2), the value of X is 100, corresponding to the number of points of interest of the same type.

To determine the similarity between a published image IP and a set of images of a proprietary base, ICi, the following steps will be carried out.

A distance d is calculated between the image IP and each of the images ICi and, at the issue of the selecting process, only the K closest images will be selected. For a selected image ICk, the distance calculated satisfies the relationship:

$\tilde{d}'_k = \inf\{\tilde{d}_1, \ldots, \tilde{d}_{NP-k}\}$, $\tilde{d}'_k$ and being the $k^{th}$ minimum distance and NP-k being the number of images of the base of the proprietary images 100 less the k images already selected (in this formula, the indices $\tilde{d}_k$ take into account the k images selected beforehand and "removed" from the base).

It can be deduced from this that:

$$P(\tilde{d}'_k < x) = 1 - \left(1 - \frac{1}{\sqrt{2\pi}}\int_{-\infty}^{x} e^{-t^2} dt\right)^{NP-k+1} \quad \text{(Eqx 5)}$$

In the context of the application, the formula applied is:

$$p(x, NP) = P(\tilde{d}'_k < x) = 1 - \left(1 - \frac{1}{\sqrt{2\pi}}\int_{-\infty}^{x} e^{-t^2} dt\right)^{NP} \quad \text{(Eqx 5a)}$$

This formula gives the probability of false alarm, i.e. the probability that an image IP which does not belong to the database of proprietary images has a normalized distance less than the value x with one of the K images closest to the base ICk. Thus, for a calculated distance dik, the probability of false alarm of the decision of first match between a published image IP and a proprietary image ICk is equal to p(dik, NP). This function also depends on the number NP of images of the base of proprietary images 100. Nevertheless, the formula is applicable in particular in the particular case in which NP=1, i.e. in which an image IP is compared to a second image IC. In this case, p(x,1) is simply the probability of false alarm associated with a centered Gaussian law.

Step Sx8 of FIG. 17 is followed by step Sx9 corresponding to step S4 of FIG. 11.

For each of the images ICk selected at the selecting step, the value of probability of false alarm calculated at step Sx8 is compared to a predetermined threshold, $P^0_{FA}$. This threshold may, for example, be given by the user.

If, for a given distance dik, the probability of false alarm obtained is less than the threshold $P^0_{FA}$, it is concluded that the published image IP and the image of the base of index ik, ICik, match with a probability of error less than $P^0_{FA}$. The value C1 is then C1=p(dik, NP). This step is then followed by the steps S5 to S10 of FIG. 11 in order to reinforce the degree of confidence in a match of "same image" type.

In the case in which the probability of false alarm obtained from dik is greater than the threshold $P^0_{FA}$, it is considered that the probability of being mistaken in deciding that the two images are in fact the same image gives a probability of false alarm greater than that set by the user, and it is not necessary to generate an alarm. This step is then followed by step S11 of FIG. 11.

Figure 21:
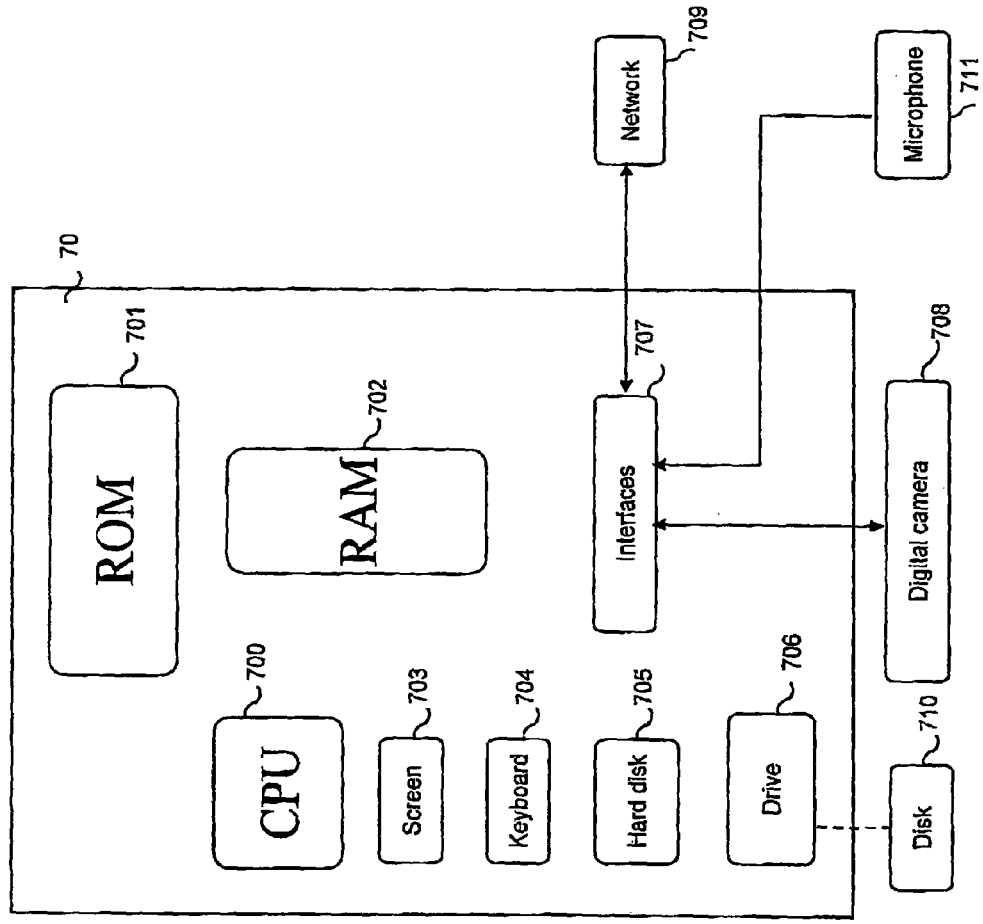
FIG. 21 is a block diagram showing an embodiment of the device for verifying digital images of FIG. 1 constructed around a micro-computer.

As represented in FIG. 21, a device for verifying multimedia entities adapted for an implementation of the methods according to the invention is preferably constructed around a micro-computer 70 with which different peripherals are associated.

The device comprises the means necessary for an implementation of the methods (means for selecting and deciding, calculating means, readjusting means, measuring means, comparing means, extracting means, obtaining means, producing means, etc.).

In conventional manner, the micro-computer 70 comprises a central processing unit (CPU) 700, a non-volatile memory such as a ROM 701, a random access memory RAM 702, man-machine interface means such as a screen 703 and a keyboard 704, means for storing information such as a hard disk 705 and a drive 706, and different peripheral interfaces 707. The term "interface" must here be interpreted broadly and is used to designate different adaptation circuits and cards such as a graphics card, a sound card, a communication interface and others. An internal communication bus (not shown) is also included in the micro-computer 70 and constitutes a non-exclusive communication means, which enables the central processing unit 700 to communicate with the different functional elements of the device according to the invention.

The micro-computer 70 is preferably connected to a digital camera or digital moving picture camera 708, via a graphics card (not shown) forming part of the interfaces 707. According to a variant, a scanner (not shown) may also be provided or any other means of image acquisition or storage supplying information to be processed according to the method of the invention.

The device according to the invention is connected to a communication network 709, such as the Internet network, which is adapted to transmit digital data to be processed or conversely to transmit data processed by the device.

The drive 706 is provided to receive a disk 710. The disk 710 may for example be a diskette, a CAROM, or a DVD-ROM. The disk 710 may contain data processed according to the invention, as for the hard disk 705, as well as a program implementing the method of verifying multimedia entities according to the invention which, once read by the microcomputer 70, is stored on the hard disk 705.

More generally, the information storage means may comprise a means readable by a computer or microprocessor, integrated or not into the device according to the invention, and possibly removable, which stores the program implementing the method according to the invention.

According to a variant, the program for implementing the method according to the invention may be stored in the read only memory 701.

According to still another variant, the program may be received via the communication network 709 to be stored in a similar manner to that described earlier.

As also shown in FIG. 21, the device according to the invention may also be equipped with a microphone 711 when the multimedia entities to be processed comprise audio signals.

The invention claimed is:

1. A method of verifying multimedia entities in a processing device to determine whether a first multimedia entity matches a second multimedia entity, characterized in that it comprises the steps of:

selecting, by a content-based search, from a plurality of second multimedia entities, a set of second multimedia entities close to said first multimedia entity, and deciding, in the processing device, as to at least one match between said first multimedia entity and at least one second multimedia entity of said set of second multimedia entities, based on a comparison between said first multimedia entity and said second multimedia entities of said set, wherein said deciding step comprises sub-steps of:

obtaining a first criterion (C1) of match reliability, comparing the first reliability criterion (C1) obtained with a predetermined threshold, in the processing device, according to the result of the comparison, deciding, in the processing device, whether a first match between the first multimedia entity and the second multimedia entity exists, and in case of a positive first match decision, the method comprises the following steps performed by the processing device:

extracting a first item of information from the first multimedia entity, comparing the extracted item of information with a second item of information of the second multimedia entity, obtaining a second criterion (C2) of match reliability, according to the result of the comparison of items of information, deciding as to a match between the first and second items of information, deciding as to a second match between the first multimedia entity and the second multimedia entity depending, on the one hand, on the decision of the first match between the first and second multimedia entity and, on the other hand, on the decision as to a match between the first and second items of information, and determining a measurement of the reliability of the decision as to the second match depending on at least one of the first and second match reliability criteria.

2. A method of verifying at least one match between a first multimedia entity and a second multimedia entity in a processing device, characterized in that the method comprises the following steps:

obtaining a first criterion (C1) of match reliability, comparing the first reliability criterion (C1) obtained with a predetermined threshold, in the processing device according to the result of the comparison, deciding, in the processing device, whether a first match between the first multimedia entity and the second multimedia entity exists, and in case of a positive first match decision, the method comprises the following steps performed in the processing device:

extracting a first item of information from the first multimedia entity, comparing the extracted item of information with a second item of information of the second multimedia entity, obtaining a second criterion (C2) of match reliability, according to the result of the comparison of items of information, deciding as to a match between the first and second items of information, deciding as to a second match between the first multimedia entity and the second multimedia entity depending, on the one hand, on the decision of the first match between the first and second multimedia entity and, on the other hand, on the decision as to a match between the first and second items of information, and determining a measurement of the reliability of the decision as to the second match depending on at least one of the first and second match reliability criteria.

3. A method according to claim 2, characterized in that the first item of information extracted from the first multimedia entity is a watermarking message.

4. A method according to claim 3, characterized in that the extraction of the watermarking message is performed on the basis of at least one extraction parameter associated with a second watermarking message of the second multimedia entity.

5. A method according to claim 4, characterized in that said at least one extraction parameter is associated with at least one insertion parameter used for the insertion of said second watermarking message in the second multimedia entity.

6. A method according to claim 2, characterized in that prior to said step of extracting a first item of information from the first multimedia entity, the method comprises a step of readjusting said first multimedia entity with respect to said second multimedia entity, in order to allow extraction of said first item of information from said readjusted first multimedia entity.

7. A method according to claim 2, characterized in that said first multimedia entity is obtained from a network.

8. A method according to claim 7, characterized in that obtaining said first multimedia entity comprises a step of identifying the address on the network of said first multimedia entity and/or the address referencing said first multimedia entity.

9. A method according to claim 2, characterized in that, the multimedia entities being images, the step of deciding as to the second match is followed by a step of producing a report containing a same scene indication if the decision as to the first match between the first multimedia entity and said second multimedia entity is positive and if the decision as to the match between the first and second items of information is negative.

10. A method according to claim 9, characterized in that, the measurement of the reliability of the decision as to the second match is associated with the same scene indication and corresponds to the first criterion of match reliability (C1).

11. A method according to claim 9, characterized in that the step of deciding as to the second match is followed by a step of inserting a same image indication in the report if the decision as to the first match between the first multimedia entity and the second multimedia entity is positive and if the decision as to the match between the first and second items of information is positive.

12. A method according to claim 11, characterized in that the measurement of the reliability of the decision as to the second match is associated with the same image indication and corresponds to the product of the first criterion of match reliability and the second criterion of match reliability.

13. A method according to claim 8, further comprising the step of producing a report that comprises an address on the network of said first multimedia entity and/or an address referencing said first multimedia entity.

14. A method according to claim 2, characterized in that the second multimedia entity forms part of a set of second multimedia entities.

15. A method according to claim 14, characterized in that, prior to the step of obtaining a first criterion of match reliability, the method comprises a step of selecting, from the set of second multimedia entities, a plurality of second multimedia entities close to said first multimedia entity.

16. A method according to claim 2, each multimedia entity comprising a plurality of units of interest, characterized in that obtaining the first criterion of match reliability comprises the following sub-steps:
  matching information on local content of the first multimedia entity with information on local content of the second multimedia entity, said information on local content being associated with units of interest,
  geometric matching of units of interest of the first multimedia entity with units of interest of the second multimedia entity, and
  defining, in one of the multimedia entities, a region comprising the units of interest resulting from the step of geometric matching;
  obtaining of the first criterion of match reliability being performed on the basis of the result of the steps of matching information on local content and geometric matching over the defined region.

17. A method according to claim 16, characterized in that, with each multimedia entity there is associated at least one descriptor determined prior to the step of obtaining the first criterion of match reliability, said at least one descriptor associated with at least one unit of interest of the multimedia entity comprising at least one item of information on local content and at least one item of position information said at least one descriptor being used during the steps of matching information on local content and of geometric matching.

18. A method according to claim 16, characterized in that the step of matching information on local content of the first multimedia entity with information on local content of the second multimedia entity comprises the following steps:
  for each item of information on local content of the first multimedia entity, selecting, from the information on local content of the second multimedia entity, information substantially close to the item of information on local content concerned, so defining a first set of matches of which each forms a pair between the item information on local content concerned of the first entity and one of the items of information substantially close to the second entity,
  for each item of information on local content of the second multimedia entity, selecting, from the information on local content of the first multimedia entity, information substantially close to the item of information on local content concerned, so defining a second set of matches of which each forms a pair between the item of information on local content concerned of the second entity and one of the items of information substantially close to the first entity,
  determining the intersection of the first and second set of matches.

19. A method according to claim 18, characterized in that selecting a set of matches for an item of information on local content concerned of a multimedia entity comprises the following steps:
  calculating the distances between said item of information on local content concerned and each of the items of information on local content of the other multimedia entity,
  determining the distances less than a predetermined threshold, so defining the set of matches concerned.

20. A method according to claim 16, characterized in that the step of geometric matching comprises the following steps:
  determining a possible geometric transformation necessary to obtain the first multimedia entity from the second multimedia entity,
  determining a set of units of interest of the first and of the second entity for which the geometric transformation makes it possible to match a unit of interest of the first multimedia entity and a unit of interest of the second multimedia entity.

21. A method according to claim 20, characterized in that the step of determining a possible geometric transformation comprises estimating the geometric coherence between position information associated with matched items of information on local content.

22. A method according to claim 16, characterized in that the second multimedia entity forms part of a set of second multimedia entities and in that obtaining the first criterion of match reliability is performed on the basis of the ratio between a probability that the first multimedia entity does not match one of the second multimedia entities and a probability that the first multimedia entity matches one of the second multimedia entities, these two probabilities being a function of the result of the matching steps.

23. A method according to claim 16, characterized in that the step of deciding is followed by a step of producing a report that comprises a thumbnail image in which a region is defined that comprises the units of interest resulting from the step of geometric matching.

24. A method according to claim 2, characterized in that, prior to the step of obtaining the first criterion (C1) of match reliability, the method comprises the steps of:
  obtaining at least one descriptor for each of the first and second multimedia entities,
  calculating a distance between the descriptors obtained.

25. A method according to claim 24, characterized in that obtaining the first criterion of match reliability is performed on the basis of the calculation of a probability of first match depending on the distance calculated.

26. A method according to claim 24, characterized in that the descriptor is obtained by the following steps:
  obtaining division of the multimedia entity into at least a predetermined number of blocks, and for each block:
extracting at least one unit of interest, and
storing the coordinates of said at least one unit of interest.

27. A method according to claim 26, characterized in that the calculation of a distance, between the descriptors obtained from the first multimedia entity and from the second multimedia entity, is performed by adding, over the set of blocks obtained by dividing each multimedia entity, the distances between units of interest belonging to said spatially matching blocks.

28. A method according to claim 27, characterized in that the distances between units of interest by block is equal to the maximum distance between coordinates of the units of interest.

29. A method according to claim 27, characterized in that the calculated distance is equal to the minimum of the distances obtained after application, to one of the multimedia entities considered, of a geometric transformation belonging to a predetermined set of transformations.

30. A method according to claim 26, characterized in that the step of obtaining division comprises the steps of:
standardizing the size of the multimedia entity to a predetermined size
dividing the standardized multimedia entity into said at least a predetermined number of blocks.

31. A method according to claim 26, characterized in that a unit of interest is an extremum of a filtering operator.

32. A method according to claim 15, characterized in that in the step of selecting a plurality of second multimedia entities close to said first multimedia entity comprises the following steps:
for each pair of first and of second multimedia entities, the steps of obtaining descriptors and of calculating the distance associated with the method of claim 24, and
selecting second multimedia entities for which the distances with the first multimedia entity are the least.

33. A method according to claim 32, characterized in that the first criterion of match reliability further depends on the number of second multimedia entities of the set of second multimedia entities.

34. A method according to claim 24, characterized in that the predetermined threshold is a predetermined value ($P^0_{FA}$) of the probability of taking an erroneous decision as to the first match between the first multimedia entity and a second multimedia entity.

35. A device for verifying at least one match between a first multimedia entity and a second multimedia entity, characterized in the device comprises:
means for obtaining a first criterion (C1) of match reliability,
means for comparing the first reliability criterion (C1) obtained with a predetermined threshold,
means for deciding as to a first match between the first multimedia entity and the second multimedia entity and which are adapted to decide as to the first match according to the result of the comparison,
means for extracting a first item of information from the first multimedia entity,
means for comparing between the extracted item of information and a second item of information of the second multimedia entity,
means for obtaining a second criterion (C2) of match reliability,
means for deciding as to a match between the first and second items of information and which are adapted to decide as to said match according to the result of the comparison of items of information, and
means for deciding as to a second match between the first multimedia entity and the second multimedia entity, said deciding means being adapted to decide as to the second match depending, on the one hand, on the decision of the first match between the first and second multimedia entity and, on the other hand, on the decision as to a match between the first and second items of information, and
means for determining a measurement of the reliability of the decision as to the second match which are adapted to determine the measurement of the reliability of the decision depending on at least one of the first and second match reliability criteria.

36. A computer program embodied in a non-transitory computer-readable medium, said program containing instructions enabling the implementation of a method of verifying a match between a first multimedia entity and a second multimedia entity according to claim 2, when that program is loaded and executed by a computer system.

* * * * *